United States Patent [19]

Blount et al.

[11] Patent Number: 5,197,148
[45] Date of Patent: Mar. 23, 1993

[54] METHOD FOR MAINTAINING DATA AVAILABILITY AFTER COMPONENT FAILURE INCLUDED DENYING ACCESS TO OTHERS WHILE COMPLETING BY ONE OF THE MICROPROCESSOR SYSTEMS AN ATOMIC TRANSACTION CHANGING A PORTION OF THE MULTIPLE COPIES OF DATA

[75] Inventors: Marion L. Blount, Mahopac; Anthony Cocchi, Larchmont; Mark F. Mergen, Mount Kisco, all of N.Y.; Stephen P. Morgan; Katalin A. V. Rader, both of Austin, Tex.

[73] Assignee: International Business Machines Corporation, Armonk, N.Y.

[21] Appl. No.: 554,105

[22] Filed: Jul. 18, 1990

Related U.S. Application Data

[63] Continuation of Ser. No. 126,820, Nov. 30, 1987, abandoned.

[51] Int. Cl.⁵ .............................................. G06F 15/00
[52] U.S. Cl. .............................. 395/575; 364/DIG. 1; 364/229; 364/230.6; 364/285; 395/200; 364/184
[58] Field of Search ... 364/200 MS File, 900 MS File, 364/184, 187; 395/425, 325, 575, 200; 371/9.1

[56] References Cited

U.S. PATENT DOCUMENTS

| | | | |
|---|---|---|---|
| 3,723,976 | 3/1973 | Alvarez et al. | 364/200 |
| 4,562,539 | 12/1985 | Vince | 364/200 |
| 4,654,819 | 3/1987 | Stiffler et al. | 364/900 |
| 4,710,870 | 12/1987 | Blackwell et al. | 364/200 |
| 4,742,447 | 5/1988 | Duvall et al. | 364/200 |
| 4,758,951 | 7/1988 | Sznyter, III | 364/200 |
| 4,779,188 | 10/1988 | Gum et al. | 364/200 |
| 4,819,159 | 4/1989 | Shipley et al. | 371/9.1 |
| 4,843,542 | 6/1989 | Dashiell et al. | 364/200 |
| 4,991,081 | 2/1991 | Bosshart | 364/200 |
| 5,047,917 | 9/1991 | Athas et al. | 395/325 |
| 5,060,150 | 10/1991 | Simor | 364/200 |

OTHER PUBLICATIONS

Kai Li et al, "Memory Coherence in Shared Virtual Memory Systems," Proceedings of the 1986 5th Annual ACM Symposium on Principles of Distributed Computing, (1986) ACM-0-89791-198-9/86/0800-0229, pp. 229-239.

Albert Chang et al, "801 Storage: Architecture and Programming," IBM T. J. Watson Research Center, Yorktown Heights, N.Y. 10598, pp. 1-14.

*Primary Examiner*—Thomas C. Lee
*Assistant Examiner*—Mehmet Geckil
*Attorney, Agent, or Firm*—Robert M. Carwell; Marilyn D. Smith

[57] ABSTRACT

A method for maintaining the overall system availability of a multi-processor data processing system in the event of a failure at one of a plurality of independent failure points. The system includes a plurality of virtual memory type processor units, each of which may include an interactive terminal, and a main memory which has access to a secondary storage device which is also accessible by the main memory of one of the other processor units. The two units are also directly interconnected by a communications mechanism making it possible to provide a shared virtual memory system. Both processor units employ the same operating system and share the same virtual address space for storing information. The interactive terminals are each connected to more than one processor unit. Failure points include the terminals, the processor units, the communication links, and the various software components that are employed by the system. The method maintains system availability by managing the storage of selected information at preestablished precise points in the processing operation. The method updates identical operating system data structures that are stored in each processor unit with the results of certain identified data processing transactions which have affected information required for succeeding processing operations in manner to insure that either identical updates occur or no update occurs. The method further insures that any changes that might have occurred in the information stored in the data structure prior to the end of an aborted transaction is returned to the initial state to permit the transaction to be retried whenever the path of the falilure can be bypassed.

3 Claims, 18 Drawing Sheets

MM = MAIN MEMORY

METHOD FOR MAINTAINING DATA AVAILABILITY AFTER COMPONENT FAILURE INCLUDED DENYING ACCESS TO OTHERS WHILE COMPLETING BY ONE OF THE MICROPROCESSOR SYSTEMS AN ATOMIC TRANSACTION CHANGING A PORTION OF THE MULTIPLE COPIES OF DATA

This is a continuation of application Ser. No. 07/126,820 filed Nov. 30, 1987, now abandoned.

FIELD OF THE INVENTION

This invention relates in general to virtual memory data processing systems comprising a plurality of similar interconnected data processing units which share the same virtual memory addressing space and in particular to an improved method for managing the shared virtual memory to minimize loss of data or data consistency as the result of the failure of any single component of the configuration.

RELATED APPLICATIONS

U.S. Pat. No. 4,742,447, in the name of Duvall et. al, entitled "Method to Control I/O Accesses in a Multi-Tasking Virtual Memory Virtual Machine Type Data Processing System", is directed to a method for use in a multi-user page segmented virtual memory data processing system in which a mapped file data structure is selectively created to permit all I/O operations to the secondary storage devices to be executed by simple load and store instructions under the control of the page fault handler.

U.S. application Ser. No. 07/014,888 filed concurrently herewith in the name of Blount et al, entitled "Method for Reducing Disk I/O Accesses in a Multi-processor Clustered Type Data Processing System", is directed to a method for managing the storage of data in a shared virtual memory data processing system having a plurality of interconnected processor units, which permits a page fault which occurs in one processing unit to be serviced by transferring a copy of the requested page from the main memory of another processor unit whenever such a copy exists rather than performing an I/O paging operation to the disk file of the processor unit which experienced the page fault.

BACKGROUND ART

The prior art has disclosed a number of virtual memory data processing systems which employ a single standalone Central Processing Unit (CPU). These systems generally employ a main memory having a plurality of individually addressable storage locations, each of which stores one byte of data and a secondary storage device such as a Disk File which includes a plurality of block addressable storage locations, each of which stores a block of data. For discussion purposes it is convenient to assume that each block address of the disk file stores a page of data comprising for example 2K (2048) bytes of data. The virtual memory concept involves what is sometimes referred to as a single-level store. In a single-level store, the maximum address range of the system is generally much larger than the real capacity of the main memory. The main memory is made to appear much larger by the use of a paging mechanism and a secondary storage device which cooperate to keep the data required by the application program in main memory. The function of the paging mechanism is to transfer a page of data from the disk file to main memory whenever a page, which is addressed by the application program, is not in main memory. This is called a page fault. Transferring the page of data from the disk file to main memory is called page fault handling.

The prior art has also disclosed a number of multi-processor system configurations that are sometimes employed to obtain increased data processing power. A multi-processor system configuration may be thought of as a plurality of processing units sharing a logical communication channel. The logical communication channel may take the form of memory shared among the processing units into which messages from one processing unit to another processing unit may be placed. Additionally, the logical communication channel may take the form of a communication network through which messages from one processing unit to another processing unit may travel.

In some prior art multi-processor system configurations referred to as tightly-coupled multi-processor configurations, the processing units in the configuration share some amount of memory which any of the processing units in the configuration may access, and each processing unit may have some amount of private memory which only it and no other processing unit may access.

Computing systems arranged in a tightly-coupled multi-processor configuration have the benefit of rapid communication via shared memory and may also exploit the shared memory as a disk cache. A page fault may occur when an application program executing on one of the processing units in a tightly-coupled multi-processor configuration addresses a page of data that is not in main memory. During page fault handling, the appropriate secondary storage device connected to the configuration is commanded to place the appropriate page of data into the shared memory. Once the page of data has been placed in the shared memory it may be addressed by any of the processing units in the configuration.

If the plurality of processing units in a multi-processor configuration are working on a common problem, it is normal for the data they access to be accessed in such a way as to experience "locality of reference". The term locality of reference is used when there is some non-zero probability that a page of data retrieved from secondary storage and placed in shared memory to satisfy a page fault resulting from an access to virtual memory by an application program executing on one processing unit in the configuration, will also be accessed by another application program, executing on another processing unit in the configuration before the page frame in shared memory holding that page of data has been re-used by the configuration to hold another page of data. If such an access by another application program executing on another processing unit in the configuration occurs, the configuration may avoid a disk access by satisfying the page fault with that page of data already in shared memory.

A practical limit however is reached for tightly-coupled multi-processor configurations when the contention for access to shared memory among the processing units in the configuration exceeds the benefit provided by the shared memory when used as a disk cache. For instance, one processing unit in the configuration may attempt to change the contents of a page of data while another processing unit is attempting to examine the contents of the same page of data. Some mechanism must normally be provided by the configuration to lock out one of the processing units in favor of the other so that the two processing units see a consistent view of the data. Various methods exist in the prior art to enforce a consistent view of data upon the processing units in a tightly-coupled multi-processor configuration. These methods involve idling one of the processing units in the configuration until the other processing unit has completed its access to shared memory. The processing unit that has been idled cannot be idle and also perform useful work; thus, contention for access to shared memory inevitably results in some loss of processing power for the configuration when considered as a whole. For these reasons, the number of processing units in a single tightly-coupled multi-processor configuration rarely exceeds six.

In some other prior art multi-processor system configurations referred to as closely-coupled multi-processor configurations, the plurality of processing units are connected via a communications network and each processing unit may access its own memory directly and no other processing unit has access to that memory. The processing units in a closely-coupled multi-processor configuration may share data by sending messages via the communications network to other processing units within the configuration. A variation on the closely-coupled multi-processor configuration distinguishes one of the processing units in the configuration as a shared memory processing unit. The main memory attached to the shared memory processing unit is used as a disk cache managed by the shared memory processing unit. The shared memory processing unit is assigned the function of controlling which of the other processing units can have access to what area of the shared memory at what time and under what configurations. When the shared memory is a virtual memory involving a fast main memory and a relatively slow secondary storage device, the size of the main memory which is required to obtain a respectable hit ratio is directly related to the total number of instructions that are being executed by the multi-processor configuration per second. Individual processing units are sometimes rated in Millions of Instructions Per Seconds (MIPS). If two 4 MIPS processing units and a third shared memory processing unit are employed in a closely-coupled multi-processor configuration, the main memory associated with the configuration must have approximately 80 megabytes of byte addressable memory to obtain a respectable hit ratio. The rule of thumb that is used is that 10 megabytes of byte addressable main memory per MIPS is required to obtain an 85 percent hit ratio in the shared memory. Therefore, if another 4 MIPS processing unit is added to the multi-processor configuration, another 40 megabytes of byte addressable memory should be added to the main memory of the shared memory processing unit to maintain the 85 percent hit ratio. A practical limit however is reached in the number of processing units that can be added to the configuration before the cost parameters and performance reach the point of diminishing returns.

More recently the prior art has begun to configure standalone personal computers or standalone engineering work stations into a local area network. In such an arrangement, which is called a loosely-coupled multi-processor configuration or a distributed system configuration or a cluster configuration, any work station can communicate with another work station employing standard communication protocols. The motivation that exists for establishing the cluster configuration is not necessarily more data processing power, but simply one of the convenience of exchanging information electronically vs. non-electronic exchange. However, it has been found in some situations that the individual work stations are running the same operating system and at times run the same application programs. A paper entitled "Memory Coherence in Shared Virtual Storage Systems" authored by Kai Li and Paul Hudak and presented at the 5th Annual Association for Computing Machinery Symposium on Principles of Distributed Computing 1986, discloses a plurality of virtual memory data processing units interconnected in a cluster configuration. In this arrangement all units have the same operating system and address the same virtual address space. Each unit is the owner of a different set of files which is stored in that owner's memory system. A non-owner running an application program obtains access to the other unit's memory system through a suitable communication link, which causes requests to the file owner for virtual pages of data which are then returned to the requester. Each unit of the cluster configuration therefore shares the set of files in its virtual memory system with the other units in the configuration. Page faults resulting from requests are serviced by the file owner. If the request is local, that is from the owner, the requested page is transferred from the owner's secondary storage directly to the owner's main memory. If the request is from a remote unit, the page is transferred from the owner's secondary storage to the requester's main memory through the communication link. A system protocol is established to control what happens to pages of data after the requesting unit is finished with them. This protocol addresses such issues as, when to return a page to the owner, how to manage concurrent requests for the same page if one unit wants to write to that page while other units want to read from that page, and various other situations that are common to functions that share stored data.

The sharing by each processing unit of its virtual memory with other processing units in the cluster has some potential advantages in that the size or capacity of the secondary storage devices can be reduced since the total number of files available to the cluster is spread out among a number of secondary storage devices. This would permit the use of devices with faster access times and/or lower cost. A potential disadvantage is that concurrent requests from a number of different units to an owning unit will each result in a number of disk accesses to occur in sequence. While the requests are generally serviced in an overlapped manner, a disk access is a relatively time consuming operation for the unit and could severely impact the performance of the owning unit which is perhaps executing an unrelated application program, that is competing for the services of the secondary storage device.

The invention disclosed and claimed in the cross-referenced U.S. application Ser. No. 07/126,814 is directed to a novel method for use by a shared virtual memory, cluster configured, data processing system in which the number of page faults requiring access to the secondary storage devices is considerably reduced.

Loosely coupled multi-processor configurations disclosed in the prior art have traditionally been architected around a message passing model in which individual kernels running on separate processing units send messages containing requests for service to other processing units within the configuration that manage configuration-wide shared resources. Reliance on a message passing model has undoubtedly occurred because message passing corresponds naturally to the underlying communications connections among the processing units, which is generally believed to compose the primary performance bottleneck in a loosely coupled configuration; however, message passing as a model for system coupling has several drawbacks.

The difficulty of directly sharing complex data structures (e.g. control blocks containing pointers) among processors in message passing systems is well known.

The difficulty of sharing complex data structures given a message-passing model is discussed in a paper entitled "A Value Transmission Method For Abstract Data Types" by M. Herlihy and B. Liskov and published in the ACM Transactions on Programming Languages and Systems, Vol. 4, No. 4 in October of 1982. This subject is further discussed in a doctoral thesis entitled "Remote Procedure Call", by B. Nelson, and published by Carnegie Mellon University in May of 1981.

In order to share a list of elements between two components of an operating system executing on separate processing units within a multi-processor configuration, which is itself a relatively common requirement, the elements have to be packed into a format suitable for transmission at the sending component, transmitted from the sending component to the receiving component, then unpacked at the receiving component. This sequence of operations is inefficient both in processor utilization and in communication channel utilization.

More important, this sequence of operations is complex and unwieldy. The primary drawback of message passing is that it forces both the sending and receiving components into awkward and complex architectures that tend to be costly and difficult to implement, debug, augment, and maintain. Since the kernel of a typical general purpose operating system tends to be composed of many interacting components, the implications of architecting the operating system of a multi-processor configuration around a message passing model tend to be enormous.

Operating systems disclosed in the prior art for tightly-coupled multi-processor configurations have not traditionally been architected around a message passing model; rather, the processing units in the configuration share some amount of main memory, their kernels share complex data structures in the shared memory, and pass among themselves only pointers to these objects. It is clear that operating systems developed for uniprocessors have, with some modification in the areas of serialization and cache consistency, been modified rather than rewritten to execute efficiently on tightly coupled multi-processor configurations. It would be unusual and difficult to modify an operating system constructed around a message passing model to execute on a tightly coupled multi-processor configuration. This tends to validate the assumption that general purpose operating systems fit more naturally into a shared storage model than a message passing one.

The IBM RT PC virtual memory management hardware provides the capability of implementing an efficient shared virtual memory and provides an ideal environment to use the method of the present invention. The IBM AIX operating system is implemented around the shared virtual memory. The virtual memory manager is of necessity constructed around a message passing model. All higher levels of the AIX operating system, including the file system and interprocess communication, are constructed around a shared memory model provided by the virtual memory manager. The shared memory architectural model will allow the individual components of the AIX operating system to be implemented in such a way as to trade some small amount of performance for simplicity, which, in turn, is the source of many other benefits.

An operating system maintains data in its memory that represents its current state. This data is volatile in the sense that it does not have to survive system restart. Data that is in main memory, and thus can be processed directly by the CPU, is frequently referred to as in-core data. It is desirable to update this data using atomic transactions, so that it is never in an inconsistent state. An example of such data is the system directory which relates files to their current locations. This directory is built up from information on disk as the system runs. While updates to it are being made, or if an update fails, the interim value of the information should not be available.

A transaction is a unit of work performed by an application program that may access (reference and/or update) data stored in virtual memory that is shared among the processing units in a cluster configuration. A transaction runs under the thread of execution of a single process running a single application program on a single processing unit in the configuration.

A transaction executing on a given processing unit may access data accessible to other transactions executing on the same processing unit. A plurality of transactions concurrently executing on the same processing unit might never actually access the same data at the same time, since most conventional processing units can execute only a single stream or thread of instructions; nevertheless, it is a usefully abstraction to assume that the transactions are executing concurrently and are accessing data stored in virtual memory that is shared among the processing units in a cluster configuration.

Since multiple concurrent transactions may (at least virtually) access shared data, it is possible that they might update data in a way that would place it in some state that would be impossible to achieve if the transactions had been executed serially (in any order) on the same data. This is an undesirable condition, since the semantics of the multiple concurrent transactions may be timing-dependent, and therefore difficulty to predict. It is desirable to ensure that shared data always appears to be in a state which could only have been achieved had the multiple concurrent transactions executed in some (any) serial order. This property is called serializability. The art of coordinating concurrent access to shared data by multiple transactions in such a way as to ensure serializability is called concurrency control.

It is desirable to control concurrency in such a way as to provide for efficient use of the resources of a processing unit. A simple way to ensure serializability is to execute the transactions serially (in some order). This is inefficient, since a transaction may require access to resource that is not immediately available, such as a virtual memory page that might not be in main memory at that time. In this case, the processing unit would have to remain idle until the resource became available, since no other transaction would be allowed to begin executing until the transaction in progress completed. There are other reasons that this approach to concurrency control is undesirable, which we shall not detail here.

Typically, it is desirable to dispatch one or more of the other concurrent transactions that can continue useful work until the resource becomes available. Because the resource may become available at a time not easily predictable by the transaction dispatcher, a suitable concurrency control algorithm is often used to ensure serializability of the concurrently executing transactions.

One approach to concurrency control is to lock shared data accessed by a transaction, and prevent other concurrent transactions from locking the same data in a way that would lead to conflict. This approach usually allows for two types of lock to be granted by an abstract entity called a lock manager: read-locks and write-locks, which indicate whether a transaction has the right to read or read-and-write, respectively, the data that the lock protects.

Conflict occurs when a transaction is holding a read-lock protecting some shared data and another transaction requests a write-lock for the same data, or when a transaction is holding a write-lock protecting some shared data, and another transaction requests either a read-lock or a write-lock for the same data. Read-locks protecting the same data may be granted to multiple concurrent transactions without conflict. A transaction requesting a lock that would conflict with lock(s) held by one or more other transaction(s) must be made to wait until the conflict has been resolved (i.e. when the other transaction(s) have freed their conflicting lock(s).

A well-known theorem is that a two-phase locking protocol, in which all locks needed by a transaction are acquired before any are freed, is sufficient to guarantee serializability.

A situation in which each of a set of two or more concurrent transactions is waiting to lock data in such a way as to lead to conflict with some other transaction(s) in the set is called deadlock. Since each transaction in the set is waiting, it cannot free the lock(s) some other transaction(s) in the set is (are) waiting for. From the inception of a deadlock onward, no useful work can be performed by any members of the deadlocked set, nor can any be performed by the set of transactions not in the deadlocked set, but that request locks that would conflict with locks held by members of the deadlocked set. We shall call this the "set of fringe transactions."

To prevent the persistence of deadlock and its consequences, most computer systems using a two-phase locking protocol periodically check for the existence of deadlock, and if found, abort one or more transactions in the deadlocked set. Aborting a transaction implies that all of the updates to data it modified must be backed out, and all the locks must be freed.

In practice, there are many other situations in which transactions may be aborted, such as system failure, transaction program error, transaction program design, and operator intervention. Since transactions may be aborted before reaching their endpoint, it is desirable that updates made by a transaction appear to be "atomic," i.e. either all of its updates are applied at the same time, or none of its updates are applied. If this rule is enforced, shared data is always kept in a consistent state, and each transaction sees either all or none of the updates made by any other transaction.

When a transaction reaches its endpoint, it requests that its updates be made visible to other transactions by using the commit service. If the operating system responds affirmatively to the transaction, all of the transaction's updates have been applied; otherwise, none have been. In either case, all of the transaction's locks have been freed. A transaction may use the backout service rather than the commit service in order to have all of its updates backed out, and all of the locks it holds freed.

There are five important, essentially different degrees of consistency which may be provided by a concurrency control mechanism based on locking (from a paper written by J. N. Gray entitled, "The Transaction Concept: Virtues and Limitations", Seventh International Conference on Very Large Databases 1981). They are:

Free Access Readers may freely reference a given object. Writers may freely update a given object.

Degree 0: Readers may freely reference a given object. Writers must lock a given object prior to updating it.

Writers conflict with other writers. Degree 1: Readers may freely reference a given object. Writers must lock a given object prior to updating it. Writers conflict with other writers. Two-phase write-locking is enforced.

Degree 2: Readers must lock a given object prior to referencing it. Writers must lock a given object prior to updating it. Readers conflict with writers. Writers conflict with other writers. Two-phase write-locking is enforced.

Degree 3: Readers must lock a given object prior to referencing it. Writers must lock a given object prior to updating it. Readers conflict with writers. Writers conflict with other writers. Two-phase locking is enforced.

The AIX operating system uses a form of shared virtual memory called cluster storage that provides atomic, serialized update semantics and Degree 3 consistency to various components of the operating system, and to subsystems and application programs . . .

The operating system uses locking to achieve serialized update semantics. A mechanism to implement locking is described in "801 Storage: Architecture and Programming" by Albert Chang and Mark Mergen. The locking mechanism may be extended to function in the distributed cluster environment. An example of an existing distributed lock manager is implemented in the Distributed Services LPP of the AIX Operating System.

SUMMARY OF THE INVENTION

The present invention discloses a method of managing a shared virtual memory clustered configured data processing system to minimize loss of data due to aborted transactions that are voluntary or result from a failure of some function in the processing thread which may be bypassed when the system is reconfigured and the transaction retried beginning at the initial starting point. The method maintains copies of data structures that are affected by identified transactions performed by one processing unit, and only updates the copy when a transaction has been committed. Transactions that must be aborted for any reason can therefore be retried since the information as it existed at the start of the transaction is available in the copy. Various data structure are established to maintain a system awareness of what unit is responsible for what files and what unit has the backup responsibility for the copies of the main accessor coordinator's changing data structures during the processing of each transaction.

DESCRIPTION OF THE PREFERRED EMBODIMENT

Figure 1:
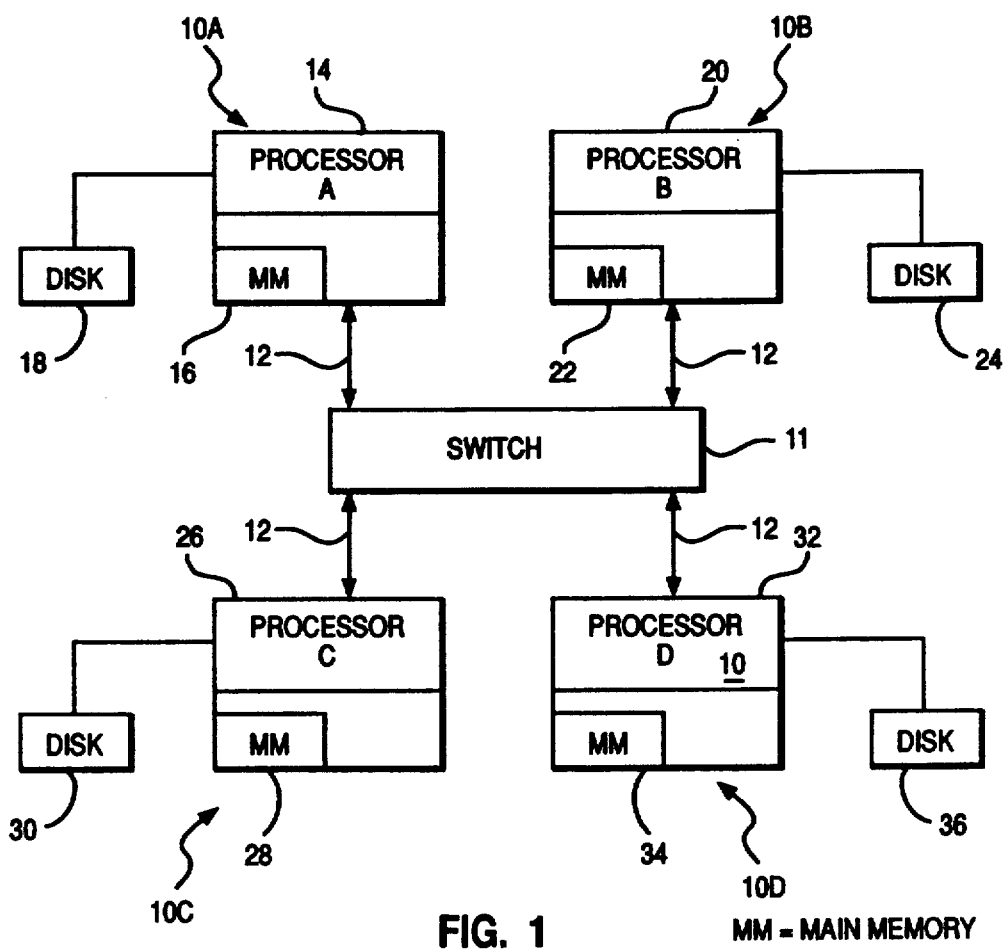
FIG. 1 is a functional block diagram of a plurality of processor units interconnected in a cluster configuration, in which the method of the present invention may be advantageously employed.

FIG. 1 is a block diagram of a cluster configuration consisting of four processing units 10a, 10b, 10c and 10d, a switch 11, and four communication links 12 that connect the processing units to the switch. Each of the processing units has a secondary storage device which may be thought of as a disk attached directly to it. Except for the contents of the files stored on the secondary storage devices attached to an individual processing unit, processing units 10a, 10b, 10c and 10d should be thought of as identical. FIGS. 2–19 illustrate typical operations in the cluster configuration. The description of these operations and the flow of messages is at a level of detail such that a person skilled in the art of implementing a software virtual memory manager component of a general purpose operating system will be able, without undue experimentation, to implement the method.

Figure 2:
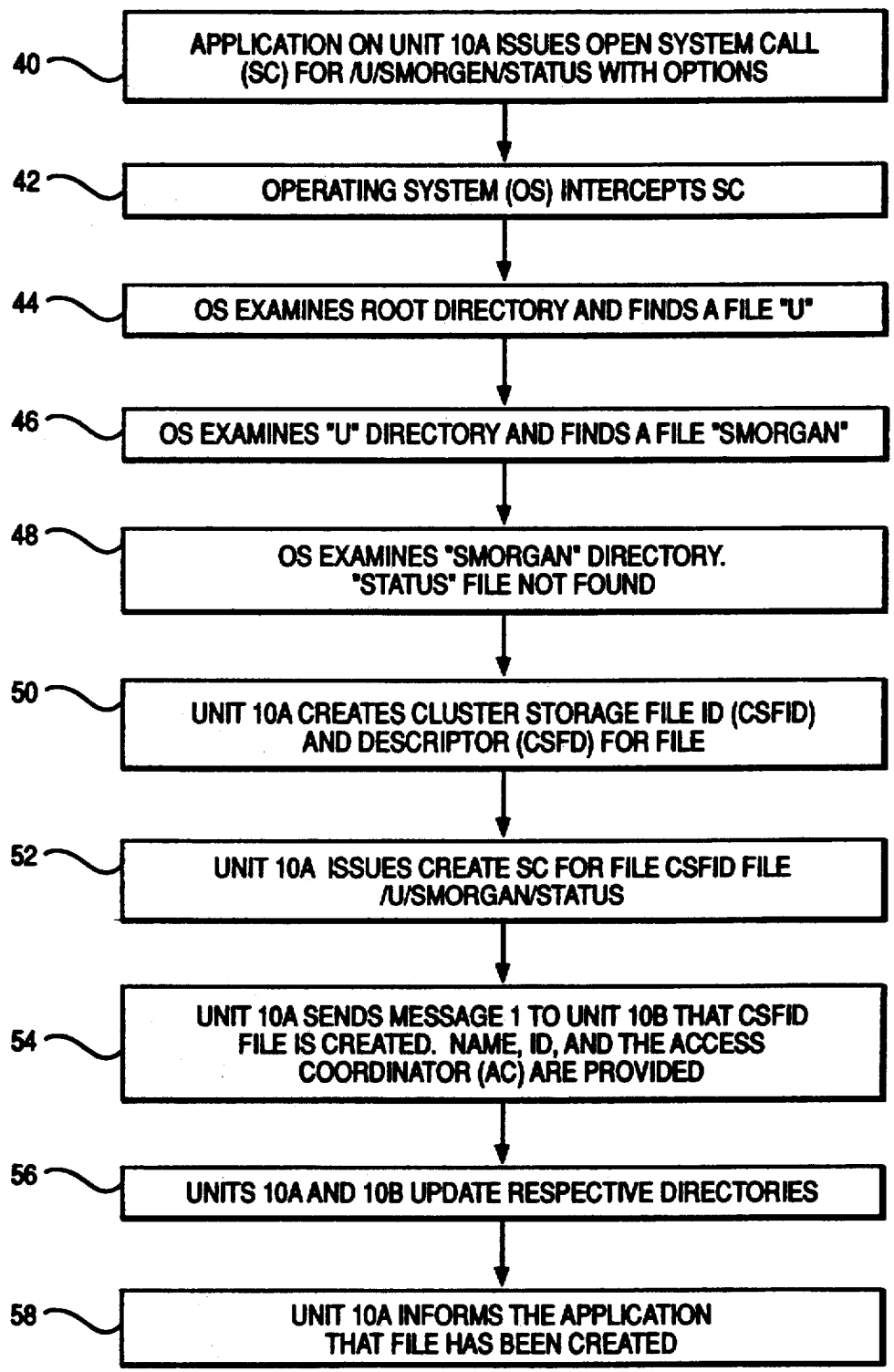
FIG. 2 contains a flow chart that describes the steps performed by the operating system executing on a given processing unit when an application program executing on that processing unit, creates and opens a cluster storage segment.

FIG. 2 contains a flow chart that describes the steps performed by the operating system executing on a given processing unit when an application program executing on that processing unit creates and opens a cluster storage segment.

In Step 40 of FIG. 2, an application program executing on processing unit 10a issues the open system call for the cluster storage file "/u/smorgan/status" with the options O_CREAT, O_RDWR, and O_TEMP. We shall assume for the purpose of discussion that a UNIX file naming convention and directory structure is used, although persons skilled in the art will understand that this assumption is not necessary for the purpose of implementing the method. The O_CREAT option implies that the operating system should create the file on behalf of the application program if the file does not already exist. The O_RDWR option implies that the application program would like to acquire read-write access to the file. The O_TEMP option implies that the file is a cluster storage file.

In Step 42 the operating system executing on processing unit 10a intercepts the system call from the application program.

In Step 44 the operating system examines the root system directory "/" and finds that it contains an entry for "u" and that u is a directory.

In Step 46 the operating system examines the u directory for "smorgan" and determines that smorgan is a directory.

In Step 48 the operating system examines the smorgan directory for "status" and determines that an entry for status does not exist.

In Step 50 the operating system creates a cluster storage file identifier CSFID and cluster storage file descriptor CSFD for the file /u/smorgan/status. For the purpose of this discussion assume that a cluster storage file identifier is a 32 bit integer that uniquely identifes the cluster storage file in the configuration. The cluster storage file identifier may have been composed by concatenating the processing unit identifier for the access coordinator (processing unit 10a) with a number chosen by the access coordinator that uniquely identifies the cluster storage file to the access coordinator. A processor identifier is a 7 bit integer that uniquely identifies a given processing unit within a cluster configuration. The operating system creates cluster storage file descriptor CSFD by using cluster storage file identifier CSFID to index into the Cluster Storage File Descriptor Table (CSFDT) located at processing unit 10a. The CSFDT located at processing unit 10a contains a cluster storage file descriptor for each existing cluster storage file for which processing unit 10a serves as access coordinator. A cluster storage file descriptor identifies the shared virtual memory segment that is associated with a given cluster storage file. In addition, a file descriptor contains other information about a file, such as its length, the time it was most recently accessed, the name of the its owner, etc. when the file /u/smorgan/ contains cluster storage file and has been created as a result of a call to open executed at processing unit 10a, processing unit 10a elects itself as the access coordinator for the file.

In Step 52 the operating system uses the Create Segment Service (CSS) to create a virtual memory segment for the cluster storage file identified by cluster storage file identifier CSFID. In doing so, processing unit 10a specifies that the segment is to be created using cluster storage file descriptor CSFD, and also that the requested protection key for the segment to be created is to be read-write. CSS returns a segment identifier S by which the segment it created may be identified. CSS creates an External Page Table (XPT) for the newly created cluster storage segment. Each of the entries in the XPT corresponds to a virtual page in the cluster storage segment and points to a disk address that is located in the processing unit's paging space. If a given virtual page of a cluster storage segment is selected by the Virtual Memory Manager's (VMM's) page replacement algorithm, the page will be copied to the disk block pointed to by its corresponding XPT entry.

In Step 54 processing unit 10a sends message 1 to processing unit 10b that the cluster storage file identified by CSFID has been created. Message 1 includes the name of the cluster storage file, its cluster storage file identifier CSFID, and the processor identifier PID of the access coordinator.

In Step 56, upon receipt of message 1 from processing unit 10a, processing unit 10b updates its copy of the system directories to indicate the existence of the newly created file /u/smorgan/status along with the cluster storage file identifier CSFID and the access coordinator processor identifier PID for the file.

In Step 58 the operating system executing on processing unit 10a informs the application program executing on processing unit 10a that the file/u/smorgan/status has been created.

Figure 3:
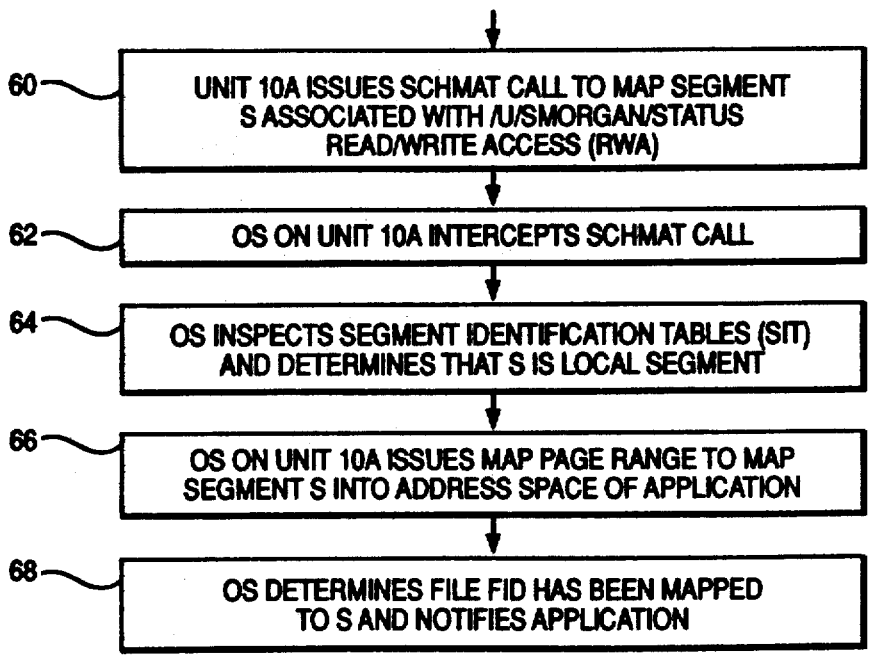
FIG. 3 is a flow chart illustrating how an open cluster storage file is loaded into the virtual memory shared in a cluster configuration.

FIG. 3 is a flow chart illustrating how a an existing, open cluster storage file is loaded into the virtual memory shared in a cluster configuration.

In Step 60 of FIG. 3, an application program executing on processing unit 10a uses the shmat system call to map the local segment S associated with the open cluster storage file "/u/smorgan/status" into the application program's virtual address space for read-write access.

In Step 62 the operating system executing on processing unit 10a intercepts the system call from the application program.

In Step 64 the operating system determines that S is a local segment. Processing unit 10a makes this determination by examining the Segment Identifier Table.

In Step 66 processing unit 10a uses the Map Page Range Service (MPRS) to map the contents of segment S into the virtual address space of the application program.

In Step 68 processing unit 10a determines that the file /u/smorgan/status has been successfully mapped into the virtual address space of the application program and informs the application program that this is the case.

Figure 4:
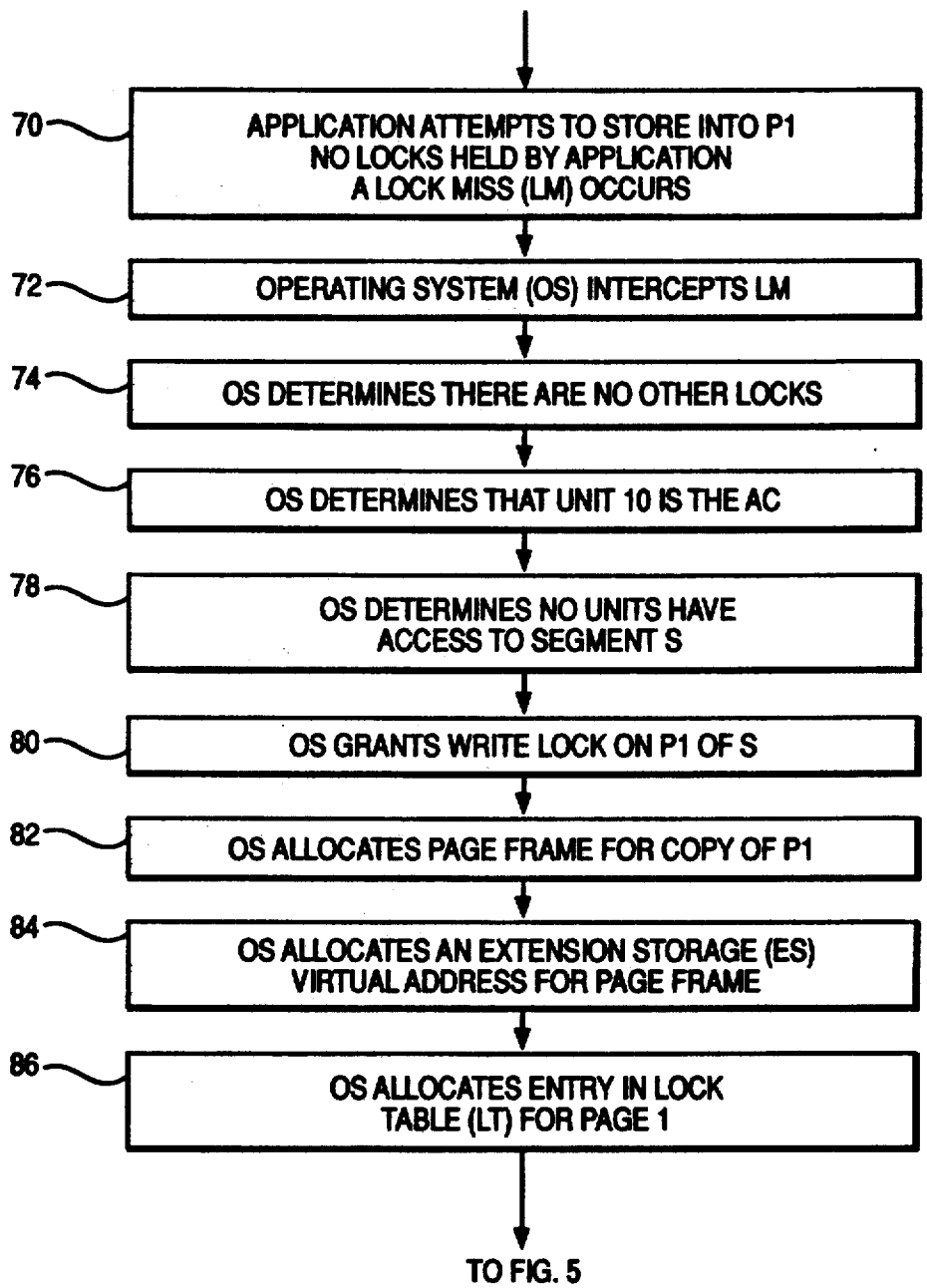
FIG. 4 is a flow chart illustrating how a transaction against an existing, open, mapped cluster storage segment is executed and committed when only a single processing unit in the configuration has opened the cluster storage segment.
Figure 5:
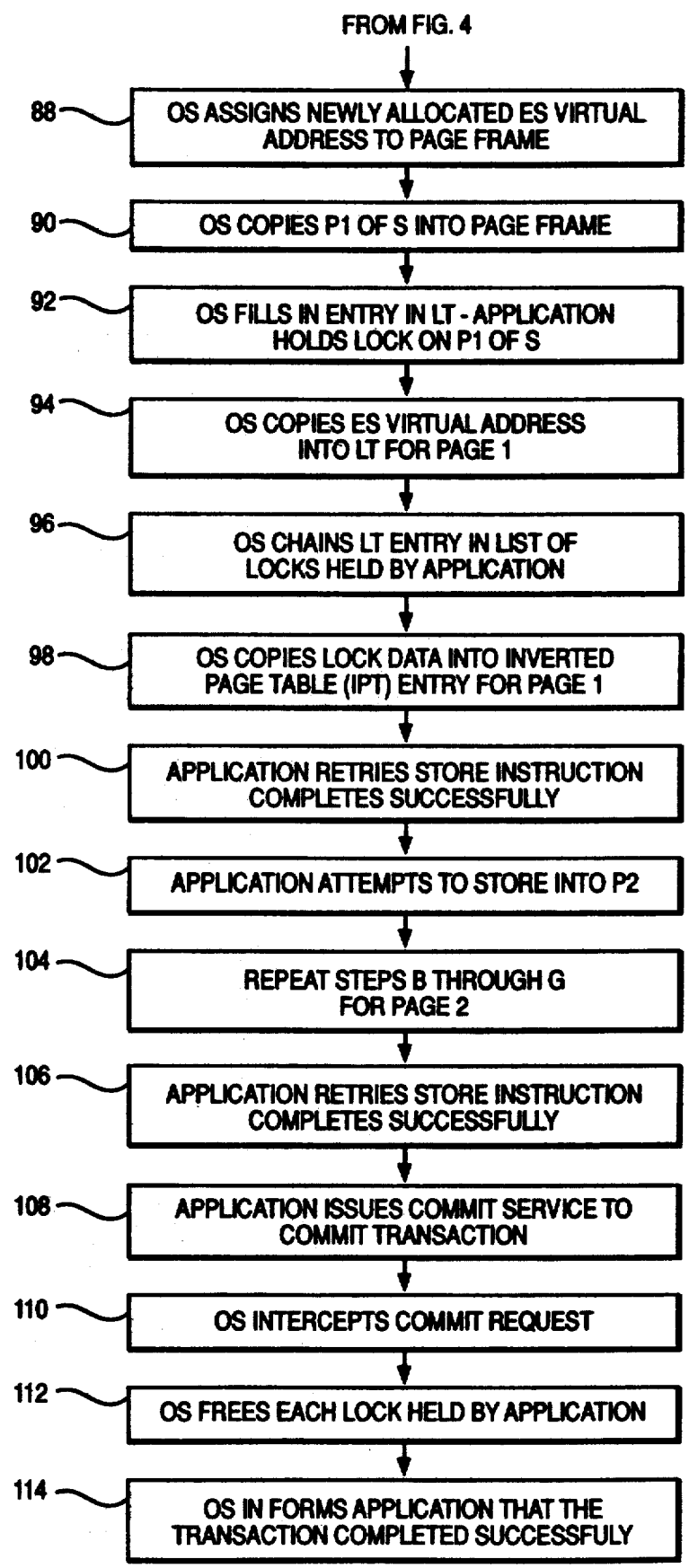
FIG. 5 is a continuation of FIG. 4.

FIG. 4 is a flow chart illustrating how a transaction against an existing, open, mapped cluster storage segment is executed and committed when only a single processing unit in the configuration has opened the cluster storage segment. For the purpose of discussion, we shall assume: (1) that segment S is a cluster storage segment mapped for read-write access by an application program executing on processing unit 10a, (2) that segment S currently contains exactly two pages of virtual memory, page one and page two, (3) that both page one and page two are currently resident in main memory, (4) and that both page one and page two have been modified since having been placed in main memory.

In Step 70 of FIG. 4, the application program executing on processing unit 10a attempts to store into page one of segment S. Since the application program does not yet hold any locks on segment S, the attempt to store into page one causes a lock miss to occur.

In Step 72 the operating system on processing unit 10a intercepts the lock miss.

In Step 74 the operating system determines that no other application program executing on processing unit 10a is holding a lock on page one of segment S.

In Step 76 the operating system determines that processing unit 10a is the access coordinator for segment S.

In Step 78 the operating system determines that no other processing unit has access to segment S.

In Step 80 the operating system grants a write lock on page one of segment S to the application program. In order to perform this operation, the operating system: (1) allocates a page frame, 82, into which a copy of the current state of page one will be made, (2) allocates an Extension Storage (ES) virtual address, 84, for the page frame, (3) allocates an entry in the Lock Table (LT) for the page, 86, and continuing to FIG. 5, (4) assigns the newly-allocated ES virtual address to the page frame, 88, (5) copies the contents of page one of segment S into the page frame, 90, (6) fills in the entry in the LT to indicate that the application program holds a lock on page one of segment S, 92, and, (7) copies the ES virtual address of the copy of the page into the LT entry for the page, 94, and (8) chains the LT entry for the page into the list of locks held by the application program, 96. The copy of the page in Extension Storage may be used to recover the contents of the page should the transaction need to be aborted. The chain of Lock Table entries held by an application program may be used to "remember" the contents of the set of virtual pages changed by the application program during the course of processing a transaction.

In Step 98 the operating system copies information concerning the lock into the Inverted Page Table (IPT) entry for the page, and schedules the application program to retry its store instruction.

In Step 100 the application program retries its store instruction, which completes successfully.

In Step 102 the application program attempts to store into page two of segment S.

In Step 104 the operating system performs operations similar to those it performed in Steps 72 through 98 for page two of segment S.

In Step 106 the application program retries its store instruction, which completes successfully.

In Step 108 the application program calls the Commit Service, indicating that it wishes to commit the transaction it has been running.

In Step 110 the operating system intercepts the commit request.

In Step 112 the operating system frees each lock held by the application program. In order to perform this operation, for each page locked by the application program, the operating system: (1) frees the Extension Storage page (if any) pointed to by the Lock Table (LT) entry for the page if the LT entry for the page indicates that the page has been modified by the application program, (2) unchains the LT entry for the page from the list of locks held by the application program, and (3) frees the lock table entry allocated for the page.

In Step 114 the operating system informs the application program that the transaction has been successfully completed.

Figure 6:
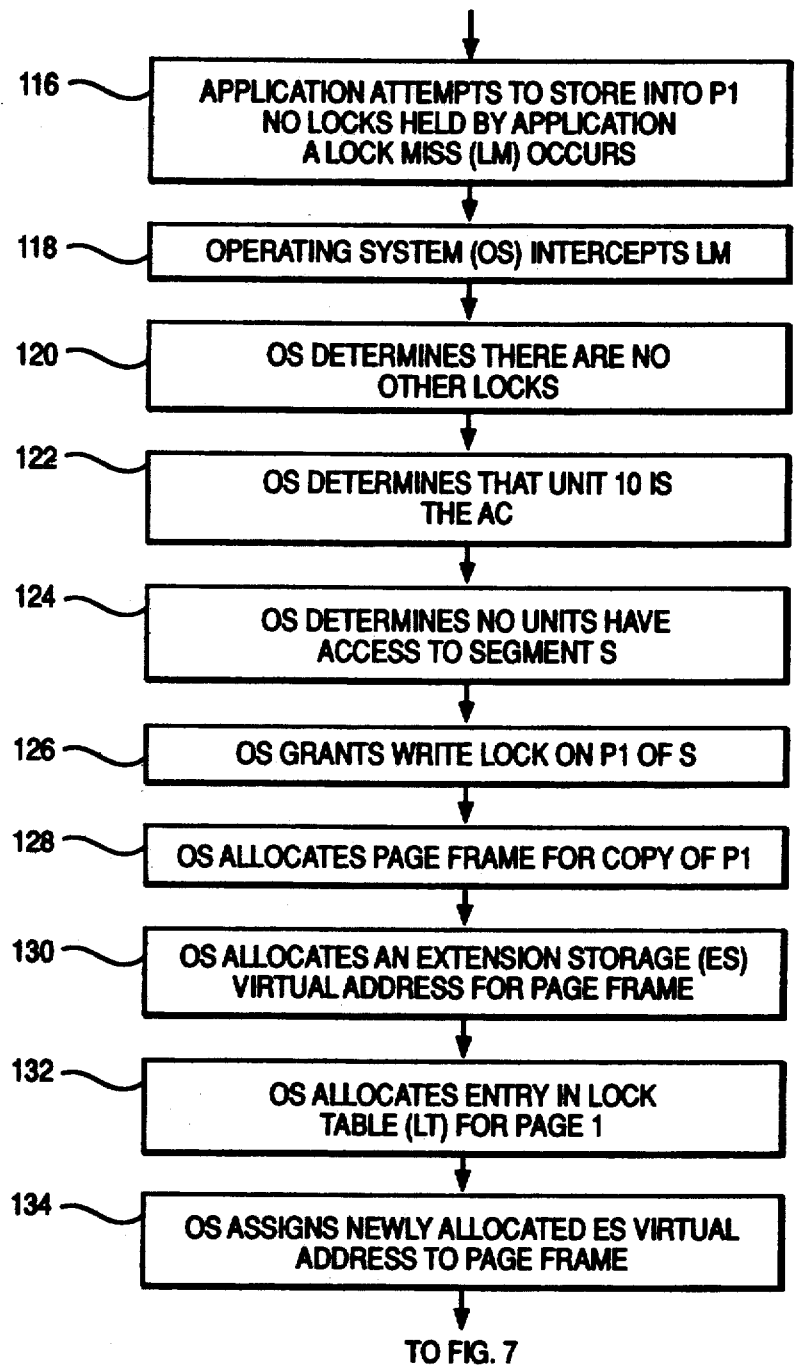
FIG. 6 is a flow chart illustrating how a transaction against an existing, open, mapped cluster storage segment is executed and aborted when only a single processing unit within the configuration has opened the cluster storage segment.

FIG. 6 is a flow chart illustrating how a transaction against an existing, open, mapped cluster storage segment is executed and aborted when only a single processing unit in the configuration has opened the cluster storage segment. For the purpose of discussion, we shall assume: (1) that segment S is a cluster storage segment mapped for read-write access by an application program executing on processing unit 10a, (2) that segment S currently contains exactly two pages of virtual memory, page one and page two, (3) that both page one and page two are currently resident in main memory, (4) and that both page one and page two have been modified since having been placed in main memory.

In Step 116 of FIG. 6, the application program executing on processing unit 10a attempts to store into page one of segment S. Since the application program does not yet hold any locks on segment S, the attempt to store into page one causes a lock miss to occur.

In Step 118 the operating system on processing unit 10a intercepts the lock miss.

In Step 120 the operating system determines that no other application program executing on processing unit 10a is holding a lock on page one of segment S.

In Step 122 the operating system determines that processing unit 10a is the access coordinator for segment S.

In Step 124 the operating system determines that no other processing unit has access to segment S.

Figure 7:
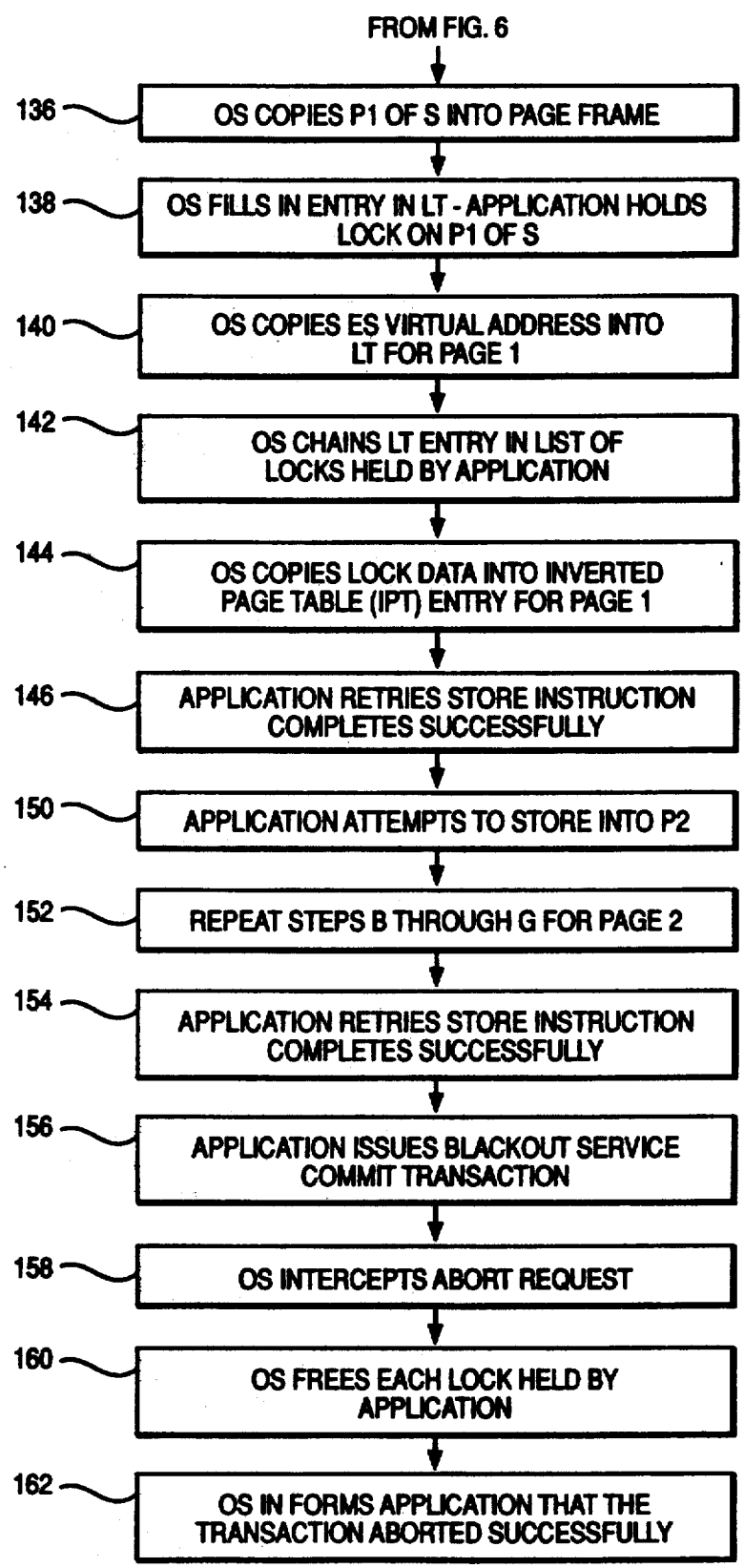
FIG. 7 is a continuation of FIG. 6.

In Step 126 the operating system grants a write lock on page one of segment S to the application program. In order to perform this operation, the operating system:

(1) allocates a page frame into which a copy of the current state of page one will be made, 128, (2) allocates an Extension Storage (ES) virtual address for the page frame, 130, (3) allocates an entry in the Lock Table (LT) for the page, 132, (4) assigns the newly-allocated ES virtual address to the page frame, 134, and continuing to FIG. 7, (5) copies the contents of page one of segment S into the page frame, 136

(6) fills in the entry in the LT to indicate that the application program holds a lock on page one of segment S, 138, (7) copies the ES virtual address of the copy of the page into the LT entry for the page 140, and (8) chains the LT entry for the page into the list of locks held by the application program, 142.

The copy of the page in Extension Storage may be used to recover the contents of the page should the transaction need to be aborted. The chain of Lock Table entries held by an application program may be used to "remember" the contents of the set of virtual pages changed by the application program during the course of processing a transaction.

In Step 144 the operating system copies information concerning the lock into the Inverted Page Table (IPT) entry for the page, and schedules the application program to retry its store instruction.

In Step 146 the application program retries its store instruction, which completes successfully.

In Step 148 the application program attempts to store into page two of segment S.

In Step 150 the operating system performs operations similar to those it performed in Steps 118 through 144 for page two of segment S.

In Step 152 the application program retries its store instruction, which completes successfully.

In Step 154 the application program calls the Backout Service, indicating that it wishes to abort the transaction it has been running.

In Step 156 the operating system intercepts the abort request.

In Step 160 the operating system frees each lock held by the application program. In order to perform this operation, for each page locked by the application program, the operating system:

(1) examines each Lock Table (LT) entry corresponding to a lock held by the application program, (2) discards the contents of any page in main memory for which an LT exists indicating that the page was modified by the application program, (3) brings the Extension Storage (ES) page pointed to by the Lock Table (LT) entry for the page into main memory for each page for which an LT exists indicating that the page was modified by the application program, (4) renames the ES page to the virtual address associated with the page whose previous contents it represents, (4) unchains the LT entry for the page from the list of locks held by the application program, and (5) frees the lock table entry allocated for the page.

In Step 162 the operating system informs the application program that the transaction has been aborted.

Figure 8:
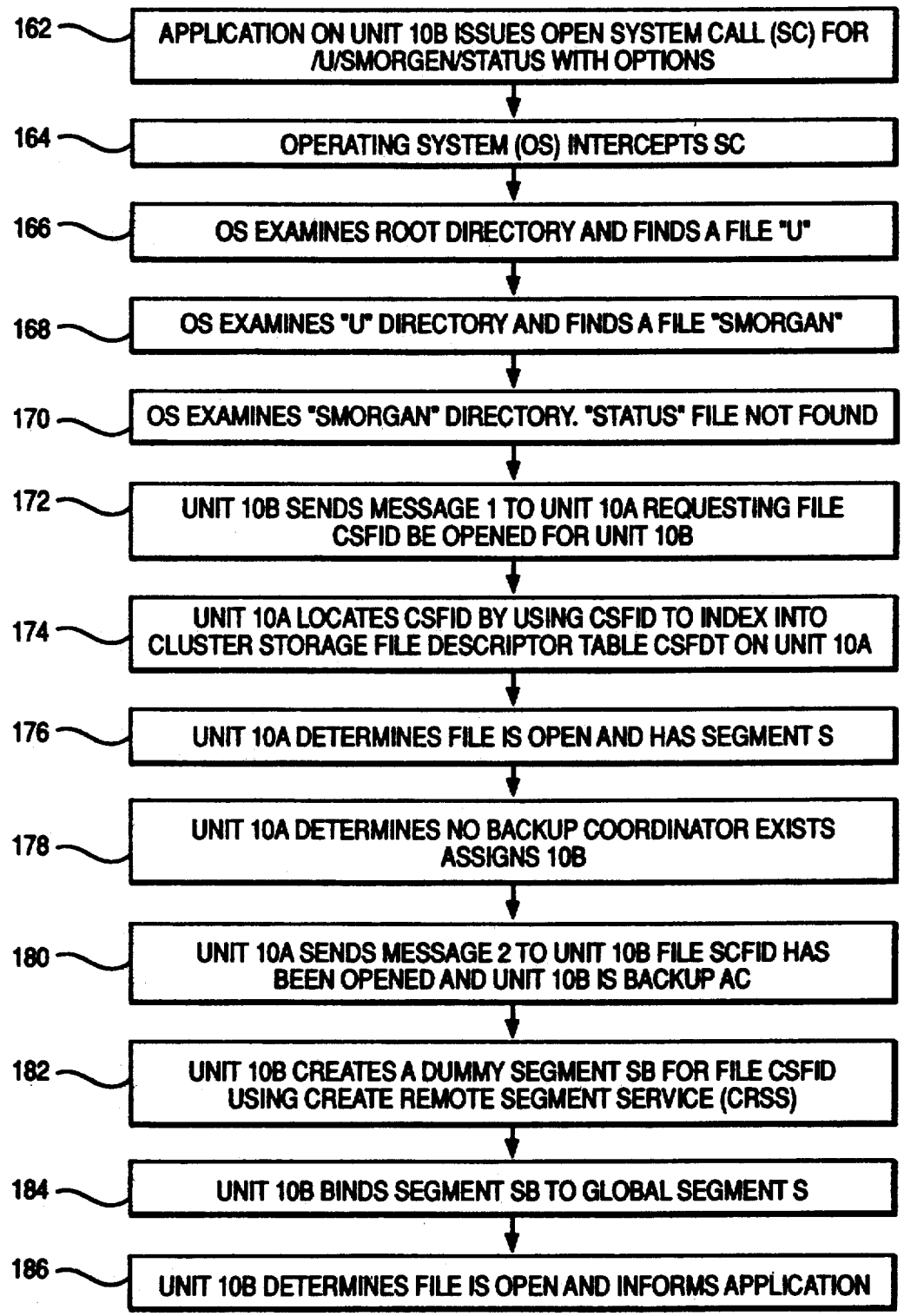
FIG. 8 is a flow chart illustrating how an existing cluster storage file is opened by an application program running on a processing unit different from the access coordinator.

FIG. 8 is a flow chart illustrating how an existing cluster storage file is opened by an application program running on a processing unit different from the access coordinator.

In Step 162 of FIG. 8, an application program executing on processing unit 10b uses the open system call to open the file "/u/smorgan/status" with the options O_CREAT, O_RDWR, and O_TEMP.

In Step 164 the operating system executing on processing unit 10b intercepts the system call from the application program.

In Step 166 the operating system examines the root system directory "/" and finds that it contains an entry for "u" and that u is a directory.

In Step 168 the operating system examines the u directory for "smorgan" and determines that smorgan is a directory.

In Step 170 the operating system examines the smorgan directory for "status" and determines:

(1) that status is a cluster storage file,
(2) that status already exists,
(3) that processing unit 10a is its access coordinator, and
(4) that CSFID is its cluster storage file identifier.

In Step 172 the operating system executing at processing unit 10b sends message 1 containing cluster storage file identifier CSFID to processing unit 10a, requesting that the cluster storage file identified by CSFID be opened on behalf of an application program executing on processing unit 10b.

In Step 174, upon receipt of message 1 from processing unit 10b, processing unit 10a locates cluster storage file descriptor CSFD, which describes the cluster storage file identified by CSFID. The processing unit 10a locates cluster storage file descriptor CSFD by using cluster storage file identifier CSFID to index into the Cluster Storage File Descriptor Table (CSFDT) located at processing unit 10a.

In Step 176 processing unit 10a determines that the cluster storage file identified by CSFID is currently open, i.e. it has virtual segment S associated with it.

In Step 178, processing unit 10a determines that the cluster storage file identified by CSFID does not yet have a backup access coordinator, elects processing unit 10b as the backup access coordinator, and fills in the cluster storage file descriptor CSFD accordingly.

In Step 180 processing unit 10a sends message 2 to processing unit 10b responding that processing unit 10a has successfully opened the cluster storage file identified by CSFID on behalf of processing unit 10b, and that processing unit 10b is the backup access coordinator for the cluster storage file identified by CSFID. Message 2 identifies the segment identifier S as the shared virtual memory segment associated with the cluster storage file identified by CSFID.

In Step 182, upon receipt of message 2 from processing unit 10a, processing unit 10b creates a local segment SB for the cluster storage file identified by CSFID using the Create Remote Segment Service (CRSS). CRSS takes the segment identifier S and creates a "dummy" segment SB. A dummy segment is a local segment with a segment identifier and a Segment Identifier Table (SIT) entry. CRSS creates an External Page Table (XPT) for the newly created cluster storage segment. Each of the entries in the XPT corresponds to a virtual page in the cluster storage segment and points to a disk address that is located in the processing unit's paging space. If a given virtual page of a cluster storage segment is selected by the Virtual Memory Manager's (VMM's) page replacement algorithm, the page will be copied to the disk block pointed to by its corresponding XPT entry.

In Step 184 processing unit 10b uses the Bind Remote Segment Service (BRSS) to bind the local segment SB to the global segment S. BRSS takes the segment identifiers S and SB, the processor identifier PID of the access coordinator (processing unit 10a), and modifies the SIT entry associated with segment SB to indicate that segment SB relates to segment S whose access is coordinated by processing unit PID.

In Step 1085 processing unit 10b determines that cluster storage file /u/smorgan/status has been successfully opened and informs the application program that this is the case.

Figure 9:
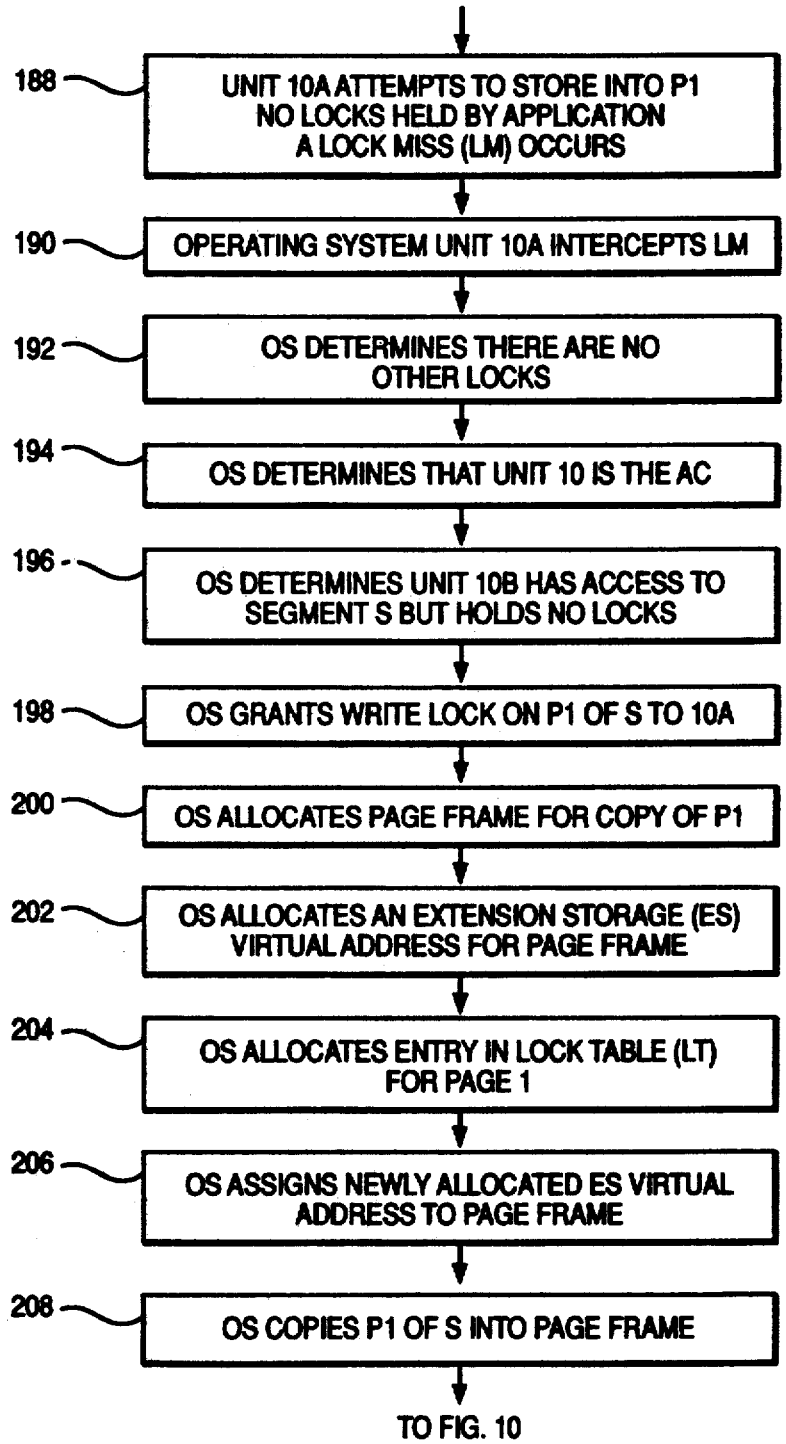
FIG. 9 is a flow chart illustrating how a transaction against an existing, open, mapped cluster storage segment is executed and committed on the processing unit serving as the access coordinator when two processing units in the configuration have opened the cluster storage segment.

FIG. 9 is a flow chart illustrating how a transaction against an existing, open, mapped cluster storage segment is executed and committed on the processing unit serving as the access coordinator when two processing units in the configuration have opened the cluster storage segment. For the purpose of discussion, we shall assume:

(1) that segment S is a cluster storage segment mapped for read-write access by an application program executing on processing unit 10a and by an application program executing on processing unit 10b,
(2) that segment S currently contains exactly two pages of virtual memory, page one and page two,
(3) that both page one and page two are currently resident in main memory in processing unit 10a,
(4) and that both page one and page two have been modified since having been placed in the main memory of processing unit 10a.

In Step 188 of FIG. 9, the application program executing on processing unit 10a attempts to store into page one of segment S. Since the application program does not yet hold any locks on segment S, the attempt to store into page one causes a lock miss to occur.

In Step 190 the operating system on processing unit 10a intercepts the lock miss.

In Step 192 the operating system determines that no other application program executing on processing unit 10a is holding a lock on page one of segment S.

In Step 194 the operating system determines that processing unit 10a is the access coordinator for segment S.

In Step 196 the operating system determines that processing unit 10b has access to segment S, but that segment S.

Figure 10:
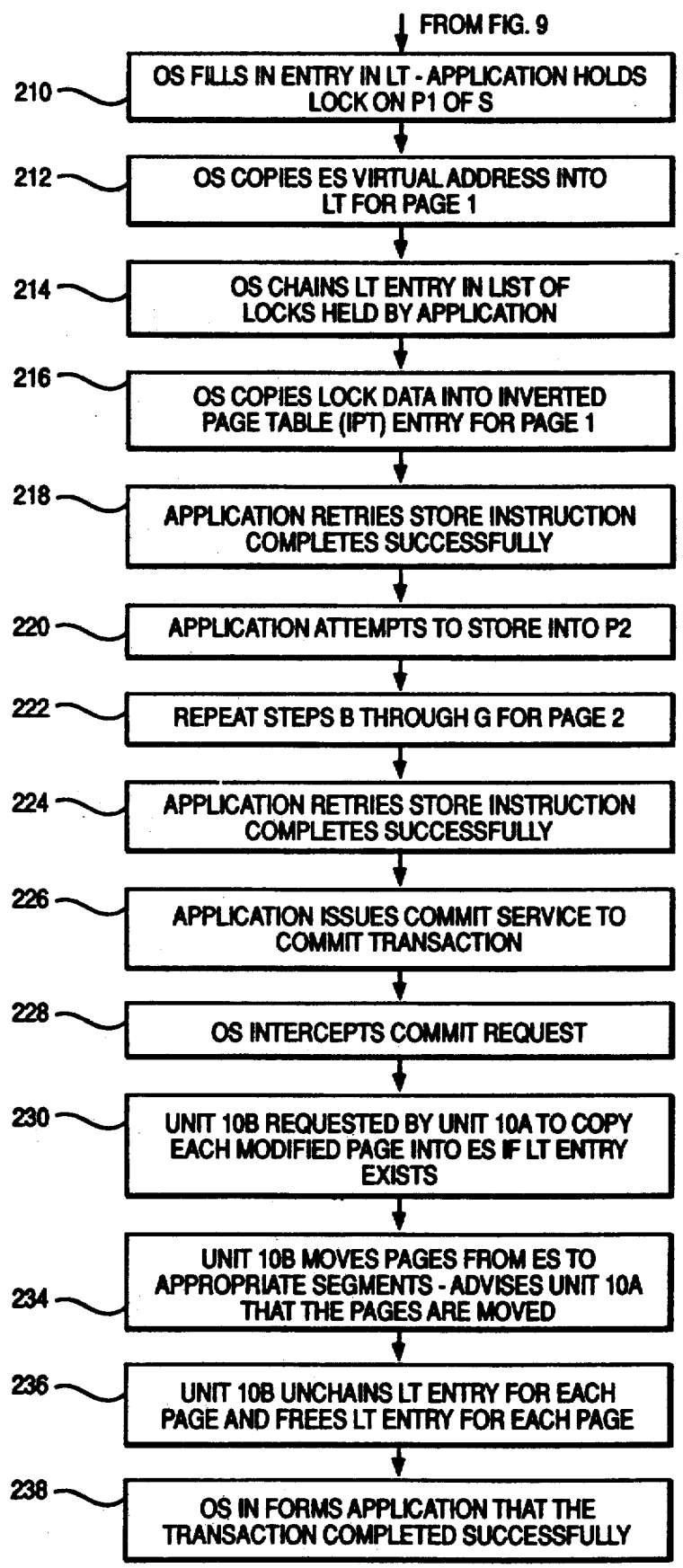
FIG. 10 is a continuation of FIG. 9.

In Step 198 the operating system grants a write lock on page one of segment S to the application program executing on processing unit 10a. In order to perform this operation, the operating system:

(1) allocates a page frame into which a copy of the current state of page one will be made, 200,
(2) allocates an Extension Storage (ES) virtual address for the page frame, 202,
(3) allocates an entry in the Lock Table (LT) for the page, 204,
(4) assigns the newly-allocated ES virtual address to the page frame, 206,
(5) copies the contents of page one of segment S into the page frame, 208, and continuing to FIG. 10,
(6) fills in the entry in the LT to indicate that the application program holds a lock on page one of segment S, 210, and,
(7) copies the ES virtual address of the copy of the page into the LT entry for the page, 212, and (8) chains the LT entry for the page into the list of locks held by the application program, 214.

The copy of the page in Extension Storage may be used to recover the contents of the page should the transaction need to be aborted. The chain of Lock Table entries held by an application program may be used to "remember" the original contents of the set of virtual pages changed by the application program during the course of processing a transaction.

In Step 216 the operating system copies information concerning the lock into the Inverted Page Table (IPT) entry for the page, and schedules the application program to retry its store instruction.

In Step 218 the application program retries its store instruction, which completes successfully.

In Step 220 the application program attempts to store into page two of segment S.

In Step 222 the operating system performs operations similar to those it performed in Steps 190 through 216 for page two of segment S.

In Step 224 the application program retries its store instruction, which completes successfully.

In Step 226 the application program calls the Commit Service, indicating that it wishes to commit the transaction it has been running.

In Step 228 the operating system intercepts the commit request.

In Step 230 for each page locked by the application program, the operating system sends a message to the backup access coordinator, processing unit 10b, requesting that processing unit 10b copy the page into its Extension Storage (ES) if the Lock Table (LT) entry for the page indicates that the page has been updated by the application program.

In Step 234, upon receipt of the last page modified by processing unit 10a, processing unit 10b moves the individual pages from its ES into their appropriate virtual memory segments, then sends a message to processing unit 10a responding that processing unit 10b has moved the pages into its ES.

In Step 236, upon receipt of the response from processing unit 10b, processing unit 10a:

(1) unchains the LT entry for each page that has been locked by the application program from the list of locks held by the application program, and (2) frees the lock table entry allocated for the page.

(3) copies each page from extension storage (ES) into virtual memory.

In Step 238 the operating system informs the application program that the transaction has been successfully completed.

Figure 11:
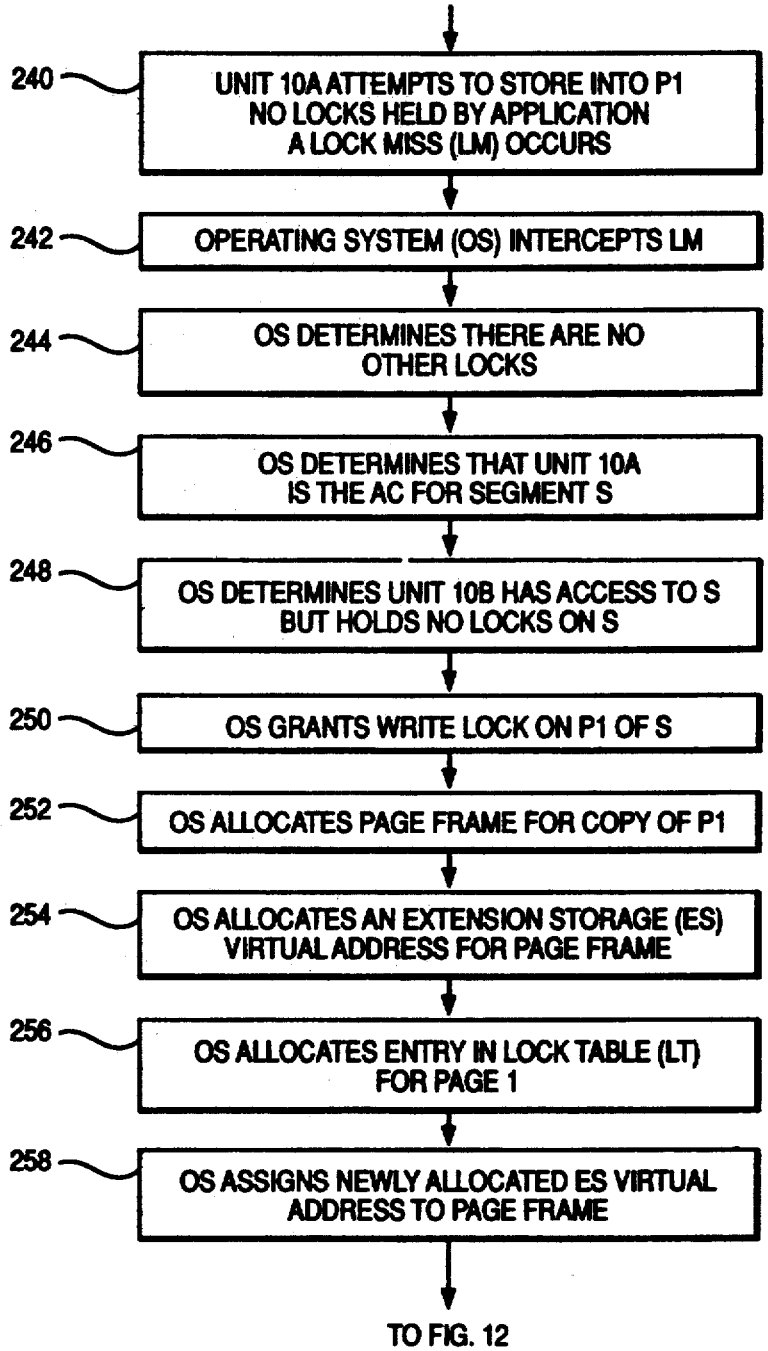
FIG. 11 is a flow chart illustrating how a transaction against an existing, open, mapped cluster storage segment is executed and aborted on the processing unit serving as the access coordinator when two processing units within the configuration have opened the cluster storage segment.

FIG. 11 is a flow chart illustrating how a transaction against an existing, open, mapped cluster storage segment is executed and aborted on the processing unit serving as the access coordinator when two processing units within the configuration have opened the cluster storage segment. For the purpose of discussion, we shall assume:

(1) that segment S is a cluster storage segment mapped for read-write access by an application program executing on processing unit 10a and by an application program executing on processing unit 10b, (2) that segment S currently contains exactly two pages of virtual memory, page one and page two, (3) that both page one and page two are currently resident in main memory in processing unit 10a, (4) and that both page one and page two have been modified since having been placed in the main memory of processing unit 10a.

In Step 240 of FIG. 11, the application program executing on processing unit 10a attempts to store into page one of segment S. Since the application program does not yet hold any locks on segment S, the attempt to store into page one causes a lock miss to occur.

In Step 242 the operating system on processing unit 10a intercepts the lock miss.

In Step 244 the operating system determines that no other application program executing on processing unit 10a is holding a lock on page one of segment S.

In Step 246 the operating system determines that processing unit 10a is the access coordinator for segment S.

In Step 248 the operating system determines that processing unit 10b has access to segment S, but that processing unit 10b does not currently hold any locks on segment S.

Figure 12:
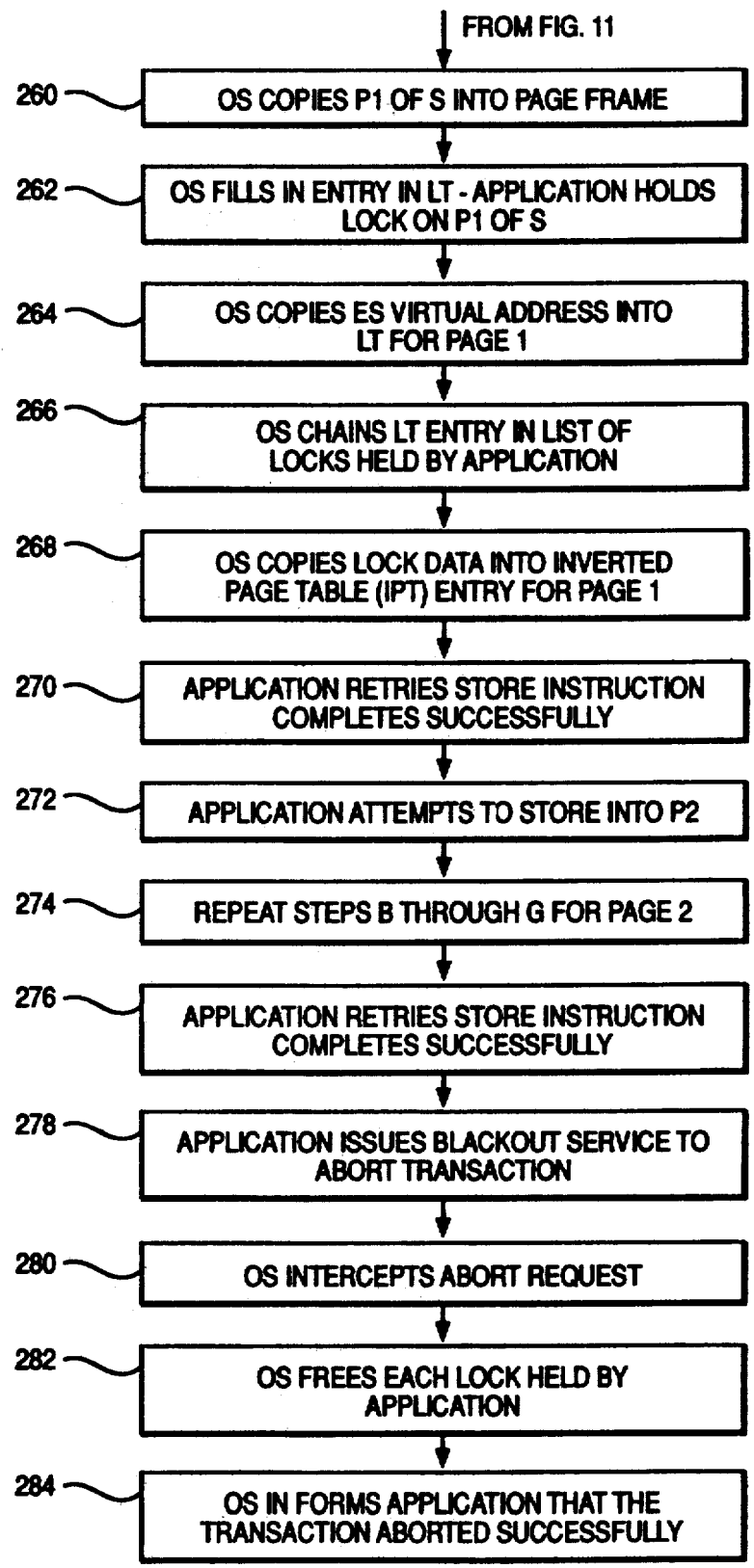
FIG. 12 is a continuation of FIG. 11.

In Step 250 the operating system grants a write lock on page one of segment S to the application program executing on processing unit 10a. In order to perform this operation, the operating system:

(1) allocates a page frame into which a copy of the current state of page one will be made, 252, (2) allocates an Extension Storage (ES) virtual address for the page frame, 254, (3) allocates an entry in the Lock Table (LT) for the page, 256, (4) assigns the newly-allocated ES virtual address to the page frame, 258, and continuing to FIG. 12, (5) copies the contents of page one of segment S into the page frame, 260, (6) fills in the entry in the LT to indicate that the application program holds a lock on page one of segment S, 262, and, (7) copies the ES virtual address of the copy of the page into the LT entry for the page, 264, and (8) chains the LT entry for the page into the list of locks held by the application program, 266.

The copy of the page in Extension Storage may be used to recover the contents of the page should the transaction need to be aborted. The chain of Lock Table entries held by an application program may be used to "remember" the original contents of the set of virtual pages changed by the application program during the course of processing a transaction.

In Step 268 the operating system copies information concerning the lock into the Inverted Page Table (IPT) entry for the page, and schedules the application program to retry its store instruction.

In Step 270 the application program retries its store instruction, which completes successfully.

In Step 272 the application program attempts to store into page two of segment S.

In Step 274 the operating system performs operations similar to those it performed in Steps 242 through 268 for page two of segment S.

In Step 276 the application program retries its store instruction, which completes successfully.

In Step 278 the application program calls the Backout Service, indicating that it wishes to abort the transaction it has been running.

In Step 280 the operating system intercepts the abort request.

In Step 282 the operating system frees each lock held by the application program. In order to perform this operation, for each page locked by the application program, the operating system:

(1) examines each Lock Table (LT) entry corresponding to a lock held by the application program, (2) discards the contents of any page in main memory for which an LT exists indicating that the page was modified by the application program, (3) brings the Extension Storage (ES) page pointed to by the Lock Table (LT) entry for the page into main memory for each page for which an LT exists indicating that the page was modified by the application program, (4) renames the ES page to the virtual address associated with the page whose previous contents it represents, (5) unchains the LT entry for the page from the list of locks held by the application program, and (6) frees the lock table entry allocated for the page.

In Step 284 the operating system informs the application program that the transaction has been aborted.

Figure 13:
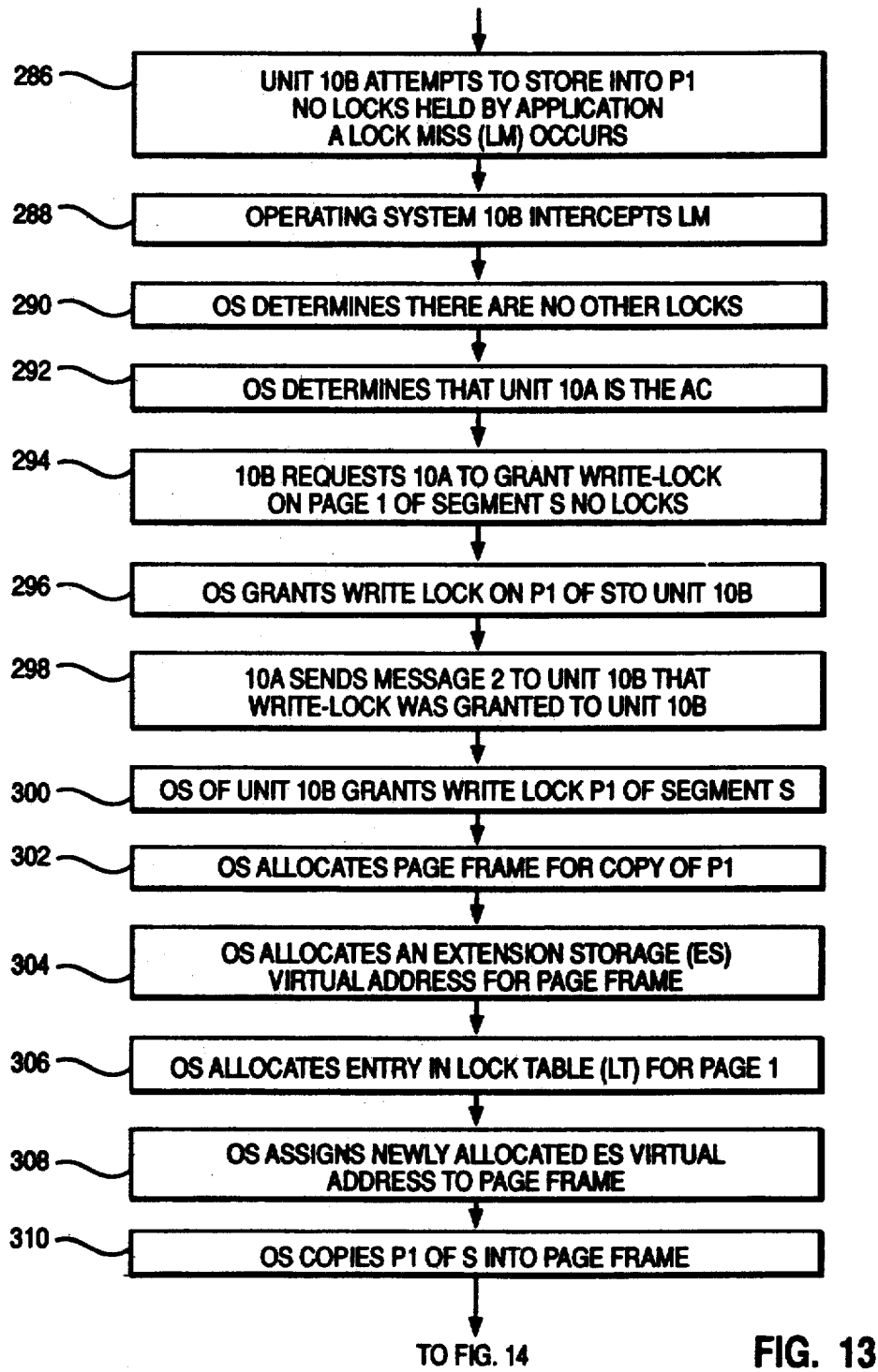
FIG. 13 is a flow chart illustrating how a transaction against an existing, open, mapped cluster storage segment is executed and committed on the processing unit serving as the backup access coordinator when two processing units in the configuration have opened the cluster storage segment.

FIG. 13 is a flow chart illustrating how a transaction against an existing, open, mapped cluster storage segment is executed and committed on the processing unit serving as the backup access coordinator when two processing units in the configuration have opened the cluster storage segment. For the purpose of discussion, we shall assume:

(1) that segment S is a cluster storage segment mapped for read-write access by an application program executing on processing unit 10a and by an application program executing on processing unit 10b, (2) that segment S currently contains exactly two pages of virtual memory, page one and page two, (3) that both page one and page two are currently resident in main memory in processing unit 10b, (4) and that both page one and page two have been modified since having been placed in the main memory of processing unit 10b.

In Step 286 of FIG. 13, the application program executing on processing unit 10b attempts to store into page one of segment S. Since the application program does not yet hold any locks on segment S, the attempt to store into page one causes a lock miss to occur.

In Step 288 the operating system on processing unit 10b intercepts the lock miss.

In Step 290 the operating system determines that no other application program executing on processing unit 10b is holding a lock on page one of segment S.

In Step 292 the operating system determines that processing unit 10a is the access coordinator for segment S.

In Step 294 processing unit 10b sends message 1 to processing unit 10a requesting that processing unit 10a grant a write-lock on page one of segment S to processing unit 10b.

In Step 296, upon receipt of message 1 from processing unit 10b, processing unit 10a determines that no other processing unit in the configuration is currently holding a lock on page one of segment S.

In Step 298 processing unit 10a sends message 2 to processing unit 10b responding that processing unit 10a has granted a write-lock on page one of segment S to processing unit 10b.

Figure 14:
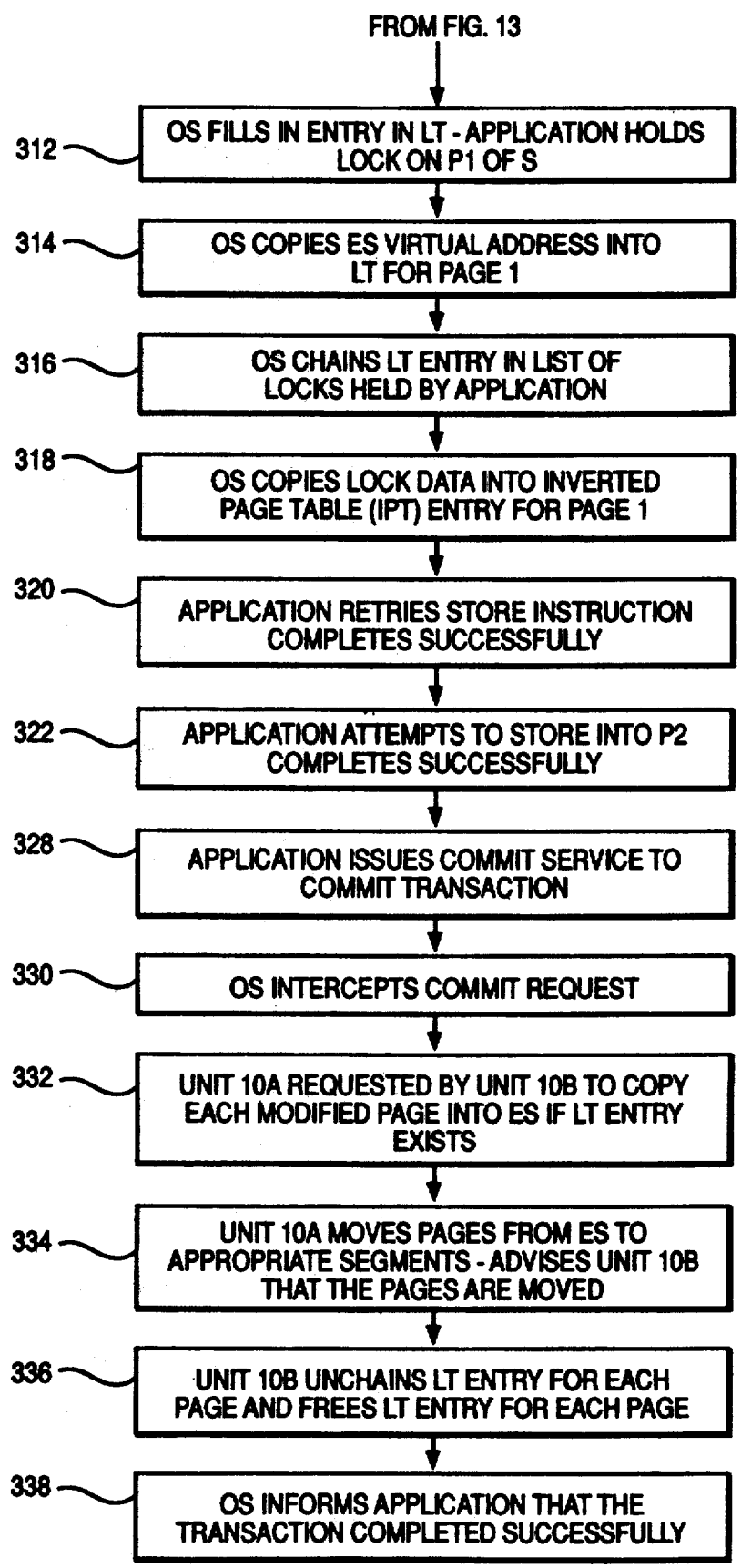
FIG. 14 is a continuation of FIG. 13.

In Step 300 the operating system of processing unit a write lock on page one of segment S to the application program executing on processing unit 10b. In order to perform this operation, the operating system:

(1) allocates a page frame into which a copy of the current state of page one will be made, 302, (2) allocates an Extension Storage (ES) virtual address for the page frame, 304, (3) allocates an entry in the Lock Table (LT) for the page, 306, (4) assigns the newly-allocated ES virtual address to the page frame, 308, (5) copies the contents of page one of segment S into the page frame, 310, and continuing with FIG. 14, (6) fills in the entry in the LT to indicate that the application program holds a lock on page one of segment S, 312, (7) copies the ES virtual address of the copy of the page into the LT entry for the page, 314, and (8) chains the LT entry for the page into the list of locks held by the application program, 316.

The copy of the page in Extension Storage may be used to recover the contents of the page should the transaction need to be aborted. The chain of Lock Table entries held by an application program may be used to "remember" the original contents of the set of virtual pages changed by the application program during the course of processing a transaction.

In Step 318 the operating system copies information concerning the lock into the Inverted Page Table (IPT) entry for the page, and schedules the application program to retry its store instruction.

In Step 320 the application program retries its store instruction, which completes successfully.

In Step 322 the application program attempts to store into page two of segment S. The operating system then performs operations similar to those it performed in Steps 288 through 320 for page two of segment S. The application then retries its store instruction, which completed successfully.

In Step 328 the application program calls the Commit Service, indicating that it wishes to commit the transaction it has been running.

In Step 330 the operating system intercepts the commit request.

In Step 332 for each page locked by the application program, the operating system of processing unit 10b sends a message to the access coordinator, processing unit 10a, requesting that processing unit 10a copy the page into its Extension Storage (ES) if the Lock Table (LT) entry for the page indicates that the page has been updated by the application program.

In Step 334, upon receipt of the last page modified by processing unit 10b, processing unit 10a moves the individual pages from its ES into their appropriate virtual memory segments, then sends a message to processing unit 10b responding that processing unit 10a has moved the pages into its ES.

In Step 336, upon receipt of the response from processing unit 10a, processing unit 10b:

(1) unchains the LT entry for each page that has been locked by the application program from the list of locks held by the application program, and (2) frees the lock table entry allocated for the page.

In Step 338 the operating system informs the application program that the transaction has been successfully completed.

(3) copies pages from its ES.

Figure 15:
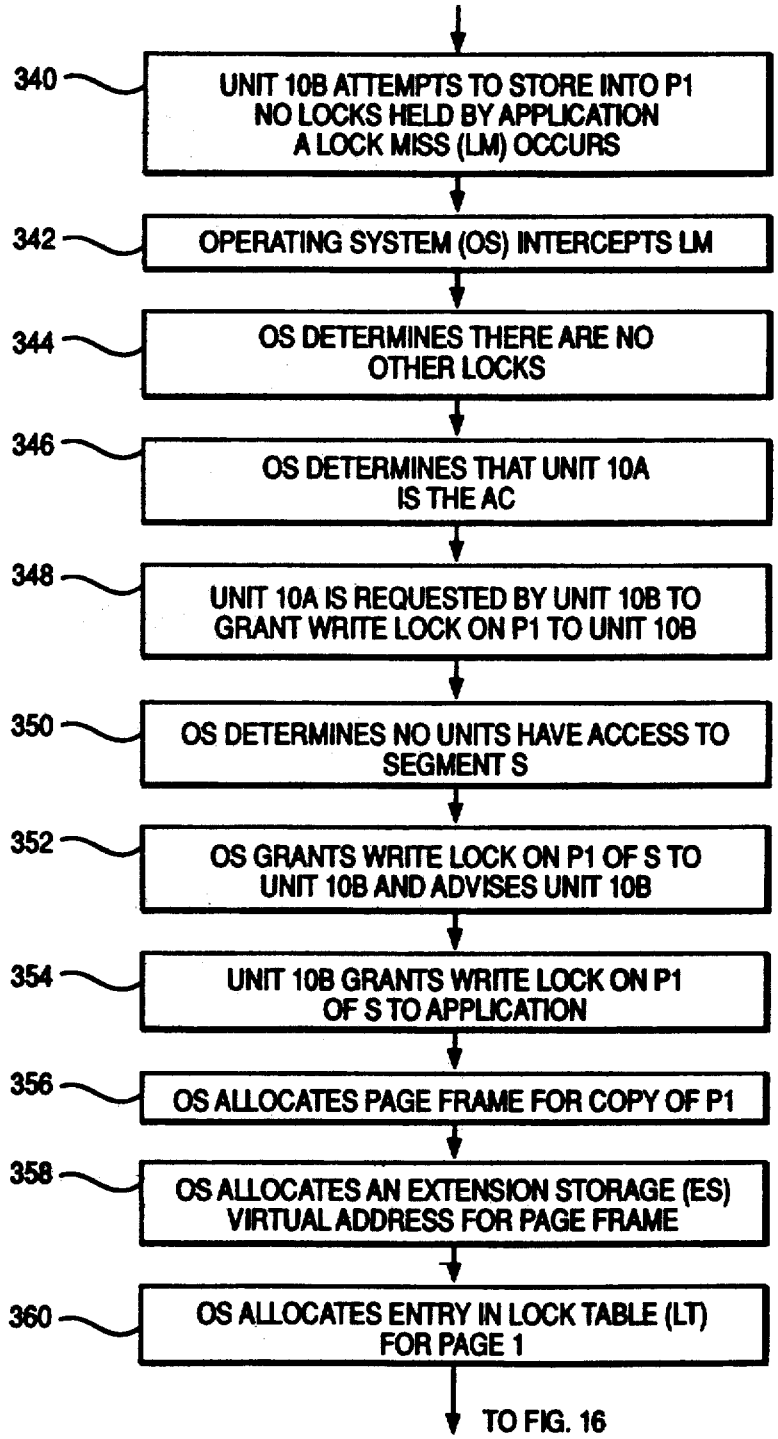
FIG. 15 is a flow chart illustrating how a transaction against an existing, open, mapped cluster storage segment is executed and aborted on the processing unit serving as the backup access coordinator when two processing units within the configuration have opened the cluster storage segment.

FIG. 15 is a flow chart illustrating how a transaction against an existing, open, mapped cluster storage segment is executed and aborted on the processing unit serving as the backup access coordinator when two processing units within the configuration have opened the cluster storage segment. For the purpose of discussion, we shall assume:

(1) that segment S is a cluster storage segment mapped for read-write access by an application program executing on processing unit 10a and by an application program executing on processing unit 10b, (2) that segment S currently contains exactly two pages of virtual memory, page one and page two, (3) that both page one and page two are currently resident in main memory in processing unit 10b, (4) and that both page one and page two have been modified since having been placed in the main memory of processing unit 10b.

In Step 340 of FIG. 15, the application program executing on processing unit 10b attempts to store into page one of segment S. Since the application program does not yet hold any locks on segment S, the attempt to store into page one causes a lock miss to occur.

In Step 342 the operating system on processing unit 10b intercepts the lock miss.

In Step 344 the operating system determines that no other application program executing on processing unit 10b is holding a lock on page one of segment S.

In Step 346 the operating system determines that processing unit 10a is the access coordinator for segment S.

In Step 348 processing unit 10b sends message 1 to processing unit 10a requesting that processing unit 10a grant a write-lock on page one of segment S to processing unit 10b.

In Step 350, upon receipt of message 1 from processing unit 10b, processing unit 10a determines that no other processing unit in the configuration is currently holding a lock on page one of segment S.

In Step 352 processing unit 10a sends message 2 to processing unit 10b responding that processing unit 10a has granted a write-lock on page one of segment S to processing unit 10b.

In Step 354 the operating system of processing unit 10b grants a write lock on page one of segment S to the application program executing on processing unit 10b. In order to perform this operation, the operating system:

(1) allocates a page frame into which a copy of the current state of page one will be made, 356, (2) allocates an Extension Storage (ES) virtual address for the page frame, 358, (3) allocates an entry in the Lock Table (LT) for the page, 360 and continuing with FIG. 16, (4) assigns the newly-allocated ES virtual address to the page frame, 362, (5) copies the contents of page one of segment S into the page frame, 364, (6) fills in the entry in the LT to indicate that the application program holds a lock on page one of segment S, 366, (7) copies the ES virtual address of the copy of the page into the LT entry for the page, 368, and (8) chains the LT entry for the page into the list of locks held by the application program, 370.

The copy of the page in Extension Storage may be used to recover the contents of the page should the transaction need to be aborted. The chain of Lock Table entries held by an application program may be used to "remember" the original contents of the set of virtual pages changed by the application program during the course of processing a transaction.

In Step 372 the operating system copies information concerning the lock into the Inverted Page Table (IPT) entry for the page, and schedules the application program to retry its store instruction.

In Step 374 the application program retries its store instruction, which completes successfully.

In Step 376 the application program attempts to store into page two of segment S.

In Step 378 the operating system performs operations similar to those it performed in Steps 342 through [H]354 for page two of segment S.

In Step 380 the application program retries its store instruction, which completes successfully.

In Step 382 the application program calls the Backout Service, indicating that it wishes to abort the transaction it has been running.

In Step 384 the operating system intercepts the abort request.

In Step 386 the operating system frees each lock held by the application program. In order to perform this operation, for each page locked by the application program, the operating system:

(1) examines each Lock Table (LT) entry corresponding to a lock held by the application program, (2) discards the contents of any page in main memory for which an LT exists indicating that the page was modified by the application program, (3) brings the Extension Storage (ES) page pointed to by the Lock Table (LT) entry for the page into main memory for each page for which an LT exists indicating that the page was modified by the application program, (4) rename the ES page to the virtual address associated with the page whose previous contents it represents, (5) unchains the LT entry for the page from the list of locks held by the application program, and (6) frees the lock table entry allocated for the page.

In Step 388 the operating system informs the application program that the transaction has been aborted. In a cluster configuration in which three or more processing units have opened the same cluster storage segment, and an application program executing on the processing unit serving as the access coordinator executes then commits a transaction, operations similar to those described in FIG. 15 are performed. The primary difference is that two additional steps are added. The former step is added between Steps 350 and 352 of FIG. 15. In this step, the access coordinator sends a list of the locks held by application programs executing at processing units other than the access coordinator and the backup access coordinator to the backup access coordinator, so that the backup access coordinator can store them in its Backup Lock Table (BLT). The BLT is used during recovery to determine which pages of the cluster storage segment were stored in the virtual memory of the individual processing units within the cluster configuration. The details of how the BLT is used to facilitate recovery are described below. The latter step is added between Steps 334 and 336 of FIG. 14. In this step, the access coordinator sends a list of locks freed by application programs executing at processing units other than the access coordinator and the backup access coordinator to the backup access coordinator, so that the backup access coordinator can remove them from its BLT.

In a cluster configuration in which three or more processing units have opened the same cluster storage segment, and an application program executing on the processing unit serving as the access coordinator executes then aborts a transaction, operations similar to those described in FIG. 15 are performed. The primary difference is that two additional steps are added. The former step is added between Steps 350 and 352 of FIG. 15. In this step, the access coordinator sends a list of the locks held by application programs executing at processing units other than the access coordinator and the backup access coordinator to the backup access coordinator, so that the backup access coordinator can store them in its Backup Lock Table (BLT). The BLT is used during recovery to determine which pages of the cluster storage segment were stored in the virtual memory of the individual processing units within the cluster configuration. The details of how the BLT is used to facilitate recovery are described below. The latter step is added between Steps 384 and 386 of FIG. 16. In this step, the access coordinator sends a list of locks freed by application programs executing at processing units other than the access coordinator and the backup access coordinator to the backup access coordinator, so that the backup access coordinator can remove them from its BLT.

In a cluster configuration in which three or more processing units have opened the same cluster storage segment, and an application program executing on the processing unit serving as the backup access coordinator executes then commits a transaction, operations similar to those described in FIG. 15 are performed.

Figure 16:
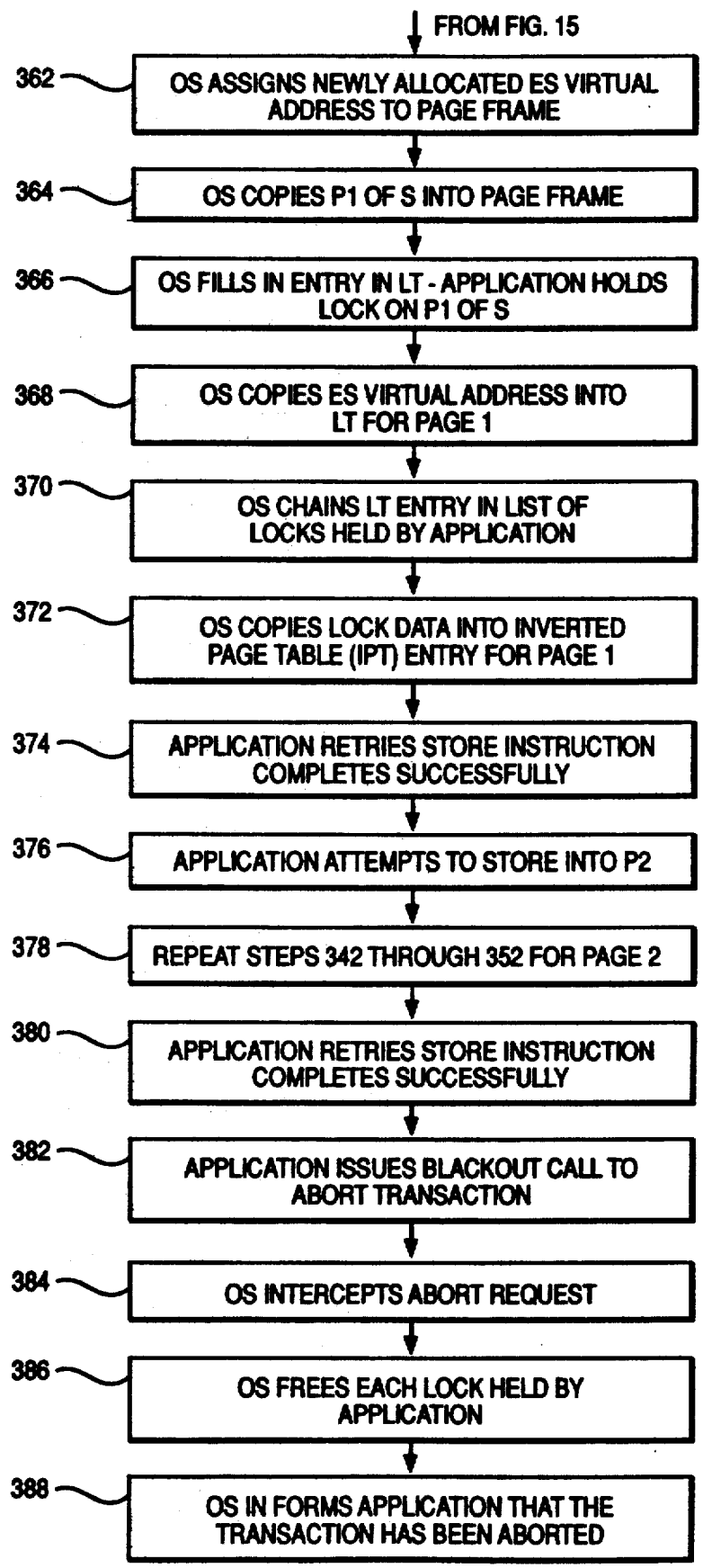
FIG. 16 is a continuation of FIG. 15.

In a cluster configuration in which three or more processing units have opened the same cluster storage segment, and an application program executing on the processing unit serving as the backup access coordinator executes then aborts a transaction, operations similar to those described in FIG. 16 are performed.

In a cluster configuration in which three or more processing units have opened the same cluster storage segment, and an application program executing on a processing unit serving as neither the access coordinator nor the backup access coordinator executes then commits a transaction, operations similar to those described in FIG. 15 are performed.

In a cluster configuration in which three or more processing units have opened the same cluster storage segment, and an application program executing on a processing unit serving as neither the access coordinator nor the backup access coordinator executes then aborts a transaction, operations similar to those described in FIG. 16 are performed.

Figure 17:
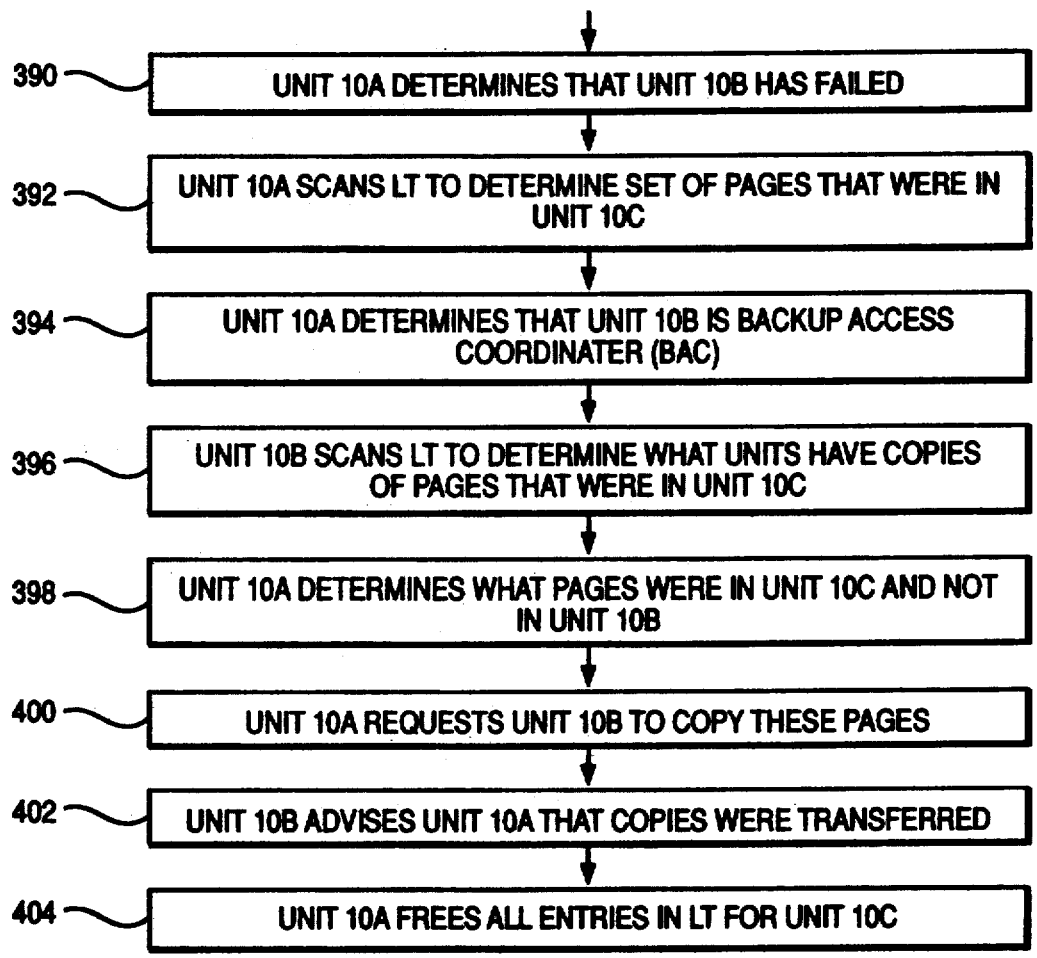
FIG. 17 is a flow chart illustrating how recovery from failure is accomplished for cluster storage segments when a processing unit serving as neither the access coordinator nor the backup access coordinator fails.

FIG. 17 is a flow chart illustrating how recovery from failure is accomplished for cluster storage segments when a processing unit serving as neither the access coordinator nor the backup access coordinator fails.

In Step 390 of FIG. 17, processing unit 10a, serving as the access coordinator, determines that processing unit 10c, not serving as the backup access coordinator, has failed.

In Step 392 processing unit 10a scans its Lock Table (LT) to determine the set of pages of the cluster storage segment that were in the virtual memory of processing unit 10c.

In Step 394 processing unit 10a determines that processing unit 10b is the backup access coordinator for the cluster storage segment.

In Step 396 processing unit 10a scans its LT to determine the set of pages in the cluster storage segment that are replicated in the virtual memory of processing units other than 10c. In the current example there is only one other processing unit, 10b, that might hold a page of the cluster segment in its virtual memory.

In Step 398 processing unit 10a compares the two sets and determines which pages of the cluster storage segment were in the virtual memory of processing unit 10c and are not in the virtual memory of processing unit 10b. Only processing unit 10a has a copy of any of these remaining pages in its virtual memory. To ensure against a further failure, processing unit 10a must replicate these pages in the virtual memory of the backup access coordinator.

In Step 400 for each of these pages processing unit 10a sends a message to the backup access coordinator, processing unit 10b, requesting that processing unit 10b copy the page into its virtual memory.

In Step 402, upon receipt of the last page from processing unit 10a, processing unit 10b sends a message to processing unit 10a responding that processing unit 10b has copied each of the pages into its virtual memory.

In Step 404, upon receipt of the response from processing unit 10b, processing unit 10a frees all of the LT entries for processing unit 10c.

Figure 18:
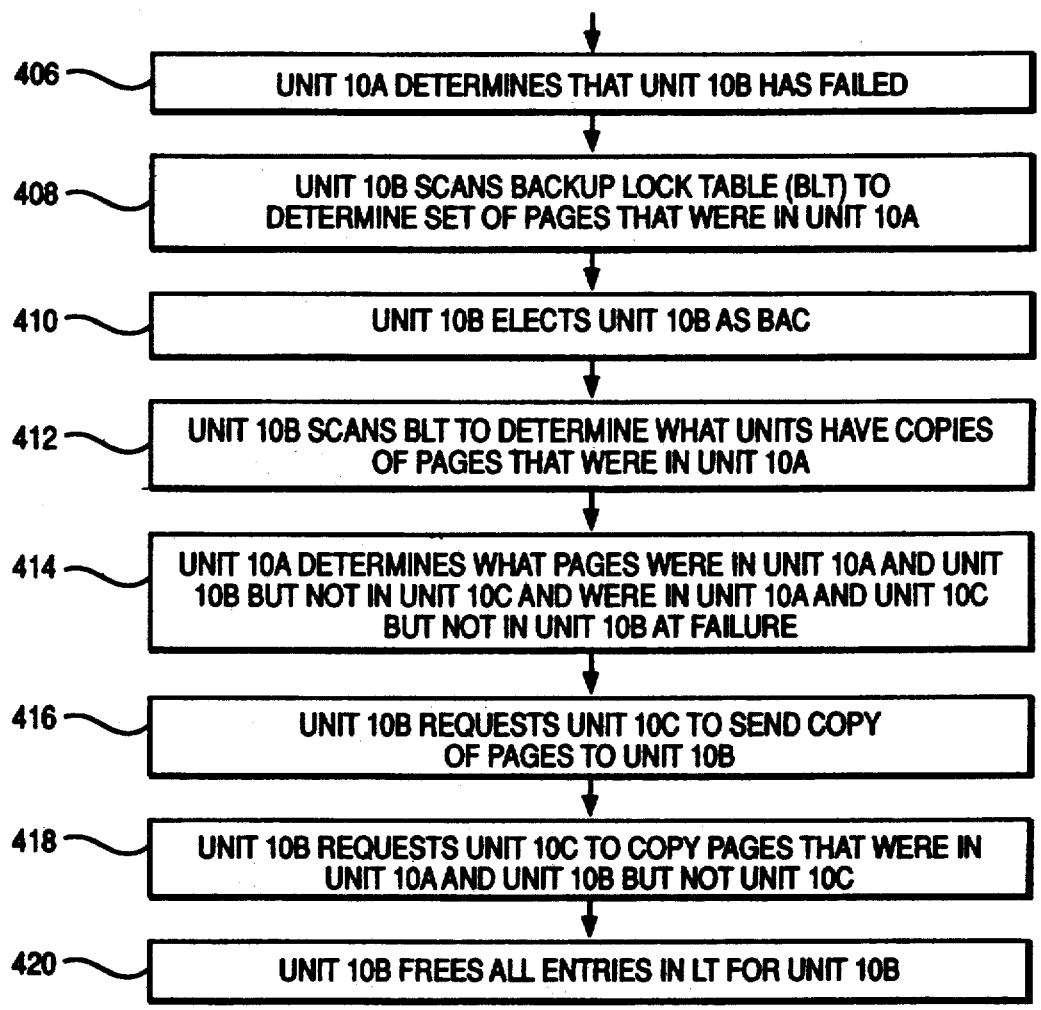
FIG. 18 is a flow chart illustrating how recovery from failure is accomplished for cluster storage segments when a processing unit serving as the access coordinator fails.

FIG. 18 is a flow chart illustrating how recovery from failure is accomplished for cluster storage segments when a processing unit serving as the access coordinator fails.

In Step 406 of FIG. 18, the processing unit serving as the backup access coordinator, processing unit 10b, determines that processing unit 10a, which was serving as the access coordinator, has failed.

In Step 408 processing unit 10b scans its Backup Lock Table (BLT) to determine the set of pages of the cluster storage segment that were in the virtual memory of processing unit 10a.

In Step 410 processing unit 10b elects processing unit 10c as the new backup access coordinator. In general, any remaining processing unit in the cluster except the current backup access coordinator might be chosen as the new backup access coordinator.

In Step 412 processing unit 10b scans its BLT to determine the set of pages of the cluster storage segment that are replicated in the memory of processing units other than processing units 10a. In this example, processing unit 10b or 10c might have had a copy of a page of the cluster segment in its virtual memory.

In Step 414 processing unit 10b compares the two sets and determines:

(1) which pages of the cluster storage segment were in the virtual memory of processing unit 10a and processing unit 10b but were not in the virtual memory of processing unit 10c when processing unit 10a failed, and (2) which pages of the cluster storage segment were in the virtual memory of processing unit 10a and processing unit 10c, but were not in the virtual memory of processing unit 10b when processing unit 10a failed.

In Step 416 for each page that was in the virtual memory of processing unit 10a and processing unit 10c but was not in the virtual memory of processing unit 10b, processing unit 10b sends a message to processing unit 10c, requesting that processing unit 10c send a copy of the page to processing unit 10b.

In Step 418, upon receiving the last page from processing unit 10c, for each page that was in the virtual memory of processing unit 10a and processing unit 10b but was not in the virtual memory of processing unit 10c, processing unit 10b sends a message to processing unit 10c, requesting that processing unit 10c copy the page into its virtual memory. Upon receipt of the last page from processing unit 10b, processing unit 10c sends a message to processing unit 10b responding that processing unit 10c has moved the pages into its virtual memory.

In Step 420, upon receipt of the response from processing unit 10c, processing unit 10b frees all of the LT entries for failed processing unit 10a.

Figure 19:
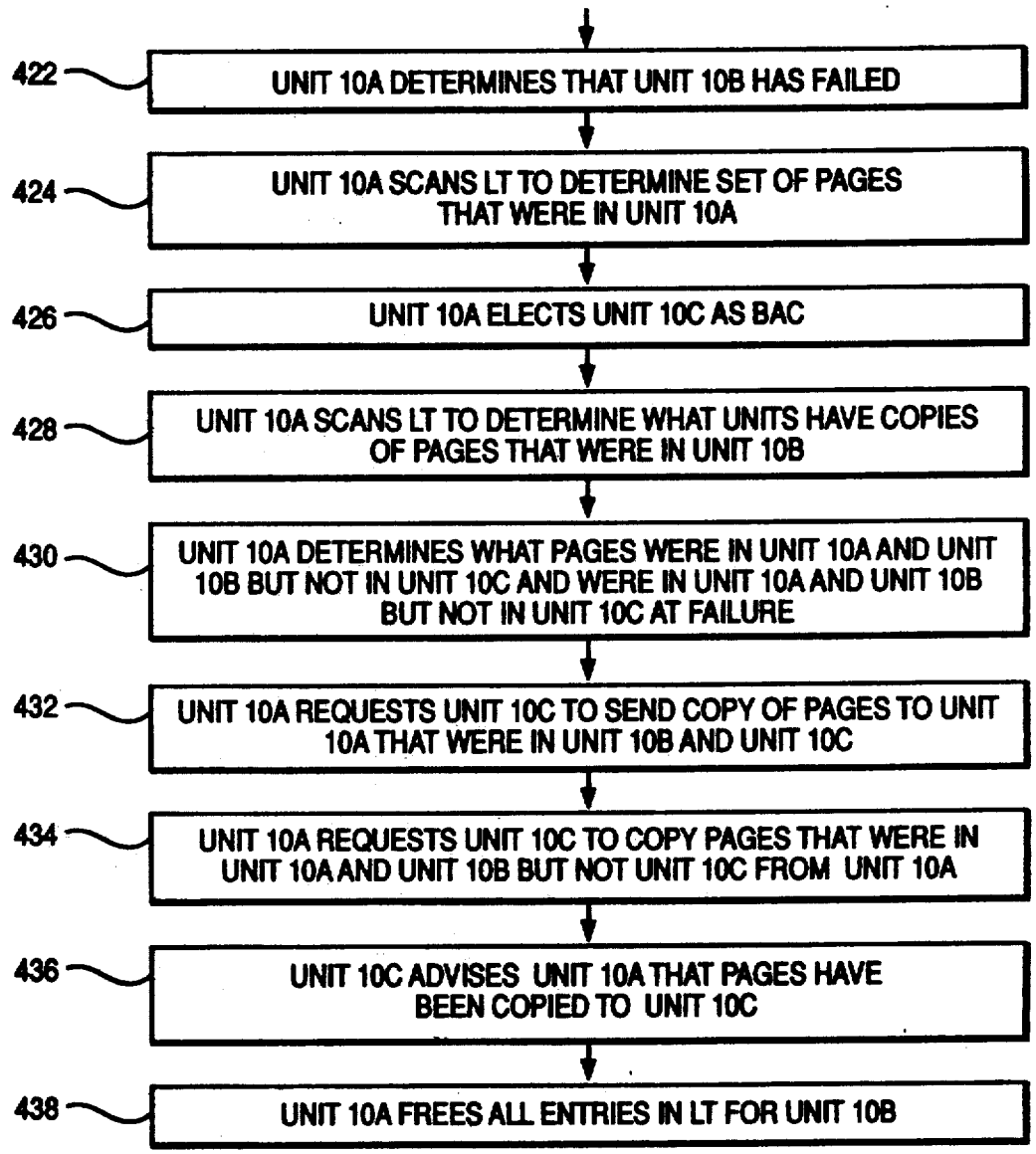
FIG. 19 is a flow chart illustrating how recovery from failure is accomplished for cluster storage segments when a processing unit serving as the backup access coordinator fails.

FIG. 19 is a flow chart illustrating how recovery from failure is accomplished for cluster storage segments when a processing unit serving as the backup access coordinator fails.

In Step 422 of FIG. 19, the processing unit serving as the access coordinator, processing unit 10a, determines that processing unit 10b, which was serving as the backup access coordinator, has failed.

In Step 424 processing unit 10a scans its Lock Table (LT) to determine the set of pages of the cluster storage segment that were in the virtual memory of processing unit 10b.

In Step 426 processing unit 10a elects processing unit 10c as the new backup access coordinator. In general, any remaining processing unit in the cluster except the current access coordinator might be chosen as the new backup access coordinator.

In Step 428 processing unit 10a scans its LT to determine the set of pages of the cluster storage segment that are replicated in the memory of processing units other than processing units 10b. In this example processing unit 10a or 10c might have had a copy of a page of the cluster segment in its virtual memory.

In Step 430 processing unit 10a compares the two sets and determines:

(1) which pages of the cluster storage segment were in the virtual memory of processing unit 10b and processing unit 10c but were not in the virtual memory of processing unit 10a when processing nit 10b failed, and (2) which pages of the cluster storage segment were in the virtual memory of processing unit 10a and processing unit 10b, but were not in the virtual memory of processing unit 10c when processing unit 10b failed.

In Step 432 for each page that was in the virtual memory of processing unit 10b and processing unit 10c but is not in the virtual memory of processing unit 10a, processing unit 10a sends a message to processing unit 10c, requesting that processing unit 10c send a copy of the page to processing unit 10a.

In Step 434, upon receiving the last page from processing unit 10c, for each page that was in the virtual memory of processing unit 10a and processing unit 10b but was not in the virtual memory of processing unit 10b, processing unit 10a sends a message to processing unit 10c, requesting that processing unit 10c copy the page into its virtual memory.

In Step 436, upon receipt of the last page from processing unit 10a, processing unit 10c sends a message to processing unit 10a responding that processing unit 10c has moved the pages into its virtual memory.

In Step 438, upon receipt of the response from processing unit 10c, processing unit 10a frees all of the LT entries for failed processing unit 10a.

While the preferred embodiment of applicant's method has been described for use in a virtual memory environment, it will be apparent to those person skilled in the art that other environments are possible and that various other modifications may be made without departing from the spirit of the invention and the scope of the appended claims.

We claim:

1. A method for managing multiple copies of data, one of said multiple copies of data defining a state, in a computerized processing system comprising the computer implemented steps of:
   establishing a plurality of microprocessor systems each having a corresponding virtual memory management facility;
   interconnecting said microprocessor systems in a cluster configuration with a plurality of communication links;
   maintaining said state of one of said multiple copies of data at each of said plurality of microprocessor systems by message communications through said communications links from at least one of said microprocessor systems;
   completing with at least one of said microprocessor systems an atomic transactions changing portion of said multiple copies of data in one of said microprocessor systems, thereby establishing a commit of said transaction; and
   preventing access to said portion of data by any of said microprocessor systems other than said at least one of said microprocessor systems completing said atomic transaction until said completing of said atomic transaction.

2. The method of claim 1 including copying with said at least one of said systems, said portion of said multiple copies of said data over one of said communication links from said at least one of said microprocessor systems to at least one other of said microprocessor systems after said commit.

3. The method of claim 2 further including
   accessing said copied portion of said data by said at least one other microprocessor system.

* * * * *